United States Patent
Reidinger et al.

(10) Patent No.: US 10,789,577 B2
(45) Date of Patent: Sep. 29, 2020

(54) WORKFLOW, ASSESSMENT, VERIFICATION, AND EVALUATION (WAVE) SYSTEM AND METHOD

(71) Applicant: CONTINENTAL TIDE DEFENSE SYSTEMS, INC., Reading, PA (US)

(72) Inventors: Keith Michael Reidinger, Reading, PA (US); Zachary David Haupt, Hazle Township, PA (US)

(73) Assignee: CONTINENTAL TIDE DEFENSE SYSTEMS INC., Reading, PA (US)

(*) Notice: Subject to any disclaimer, the term of this patent is extended or adjusted under 35 U.S.C. 154(b) by 0 days.

(21) Appl. No.: 15/494,015

(22) Filed: Apr. 21, 2017

(65) Prior Publication Data

US 2017/0308869 A1 Oct. 26, 2017

Related U.S. Application Data

(60) Provisional application No. 62/325,820, filed on Apr. 21, 2016.

(51) Int. Cl.
| | |
|---|---|
| *G06Q 10/00* | (2012.01) |
| *G06Q 10/06* | (2012.01) |
| *G05B 23/02* | (2006.01) |
| *G05B 19/042* | (2006.01) |

(52) U.S. Cl.
CPC .......... *G06Q 10/20* (2013.01); *G05B 23/0213* (2013.01); *G06Q 10/0633* (2013.01); *G06Q 10/0635* (2013.01); *G06Q 10/06395* (2013.01); *G05B 19/042* (2013.01)

(58) Field of Classification Search
CPC .............. G05B 19/042; G05B 23/0213; G06Q 10/0633; G06Q 10/0635; G06Q 10/06395; G06Q 10/20
USPC ........... 702/182, 184; 700/101, 117; 706/46; 324/627; 340/10.4
See application file for complete search history.

(56) References Cited

U.S. PATENT DOCUMENTS

| | | | |
|---|---|---|---|
| 8,260,736 B1 * | 9/2012 | Lear .......................... | G06N 5/02 706/46 |
| 8,994,492 B2 * | 3/2015 | Farhan ............... | G05B 23/0278 340/10.4 |
| 2002/0190725 A1 * | 12/2002 | Craven .................. | G01R 29/10 324/627 |

(Continued)

*Primary Examiner* — John H Le
(74) *Attorney, Agent, or Firm* — Daly, Crowley, Mofford & Durkee, LLP

(57) ABSTRACT

All equipment will fail if not properly maintained so it is imperative to check the state of the equipment, periodically. Accordingly, an assessment system including an equipment analyzer is provided for analyzing the state of equipment. The analyzer includes an interactive interface for arranging a plurality of selectable assessment elements. Each element represents an assessment procedure for evaluating a state of equipment and is linked to a respective process pipeline. A controller activates a tool in the process pipeline for carrying out an assessing task. The controller verifies whether the task is complete based on feedback provided by the user and stores the feedback for generating reports. Whether a tool is activated or a task can be completed is limited to when the user is at the point of evaluation. Accordingly, the assessment system can ensure that evaluations are accurately completed at the time of evaluation.

32 Claims, 20 Drawing Sheets

(56) References Cited

U.S. PATENT DOCUMENTS

2015/0363985 A1\* 12/2015 Kyle, Jr. ............ G07C 9/00015
340/5.51

\* cited by examiner

WORKFLOW, ASSESSMENT, VERIFICATION, AND EVALUATION (WAVE) SYSTEM AND METHOD

CROSS-REFERENCE TO RELATED APPLICATION

This application claims the benefit under 35 U.S.C. § 119(e) of U.S. Provisional Application Ser. No. 62/325,820 filed on Apr. 21, 2016 the entire disclosure of which is incorporated herein by reference.

BACKGROUND

Conventional procedural assessments utilize a written or typed paper document with a specified order of steps that need to be completed to determine the current status of a system. Some industrial systems include, but are not limited to: Sliding Hydraulic Water-Tight Doors, Diesel Engines, Gas Turbines, Cargo and Weapons Handling Elevators, Personnel Elevators, and Vertical Package Conveyors. Procedural assessments are used to determine the current status of a system and to identify defects and issues within the sub-systems, parts, and components.

The assessments are accomplished by a trained subject matter expert assigning an appropriate rating for each system, sub-system, part, and/or component and also providing specified inspection data inputs. The assessor also provides detailed comments in order to better describe the meaning behind a specified rating given to a system. The underlying comments associated with the rating provide a detailed account of all necessary issues and recommended resolutions or repairs required to give the system a satisfactory rating.

These assessment procedures are designed to inspect and rate each piece of equipment across the spectrum of operating states for the given system. The assessment contains the steps needed to complete an inspection or evaluation of a system, but not necessarily all the information regarding operation of the system or specifics pertaining to the sub-systems, parts, or components. This information is typically contained in separate reference documentation such as, but not limited to: Technical publications, drawings, operator manuals, parts lists, and repair procedures. These documents are, in addition to the assessment procedure and required subject matter expert, necessary to have at the point of performance.

Once an assessment procedure is completed, the assessor typically needs to complete reports and/or deliverables that are intended to provide feedback on the condition of the system. These report deliverables can include but are not limited to: Condition Reports, Trip Reports, Daily Reports, Data Metrics, Data Analytics, and Recommended Resolutions. The report deliverables are typically generated after an assessment or evaluation has been completed and is derived from a combination of the written paper procedure, sketches, and notes that are generated by the assessor. The report deliverables also range in magnitude from a one-page report to multiple reports that are numerous pages.

These report deliverables are intended to provide a comprehensive view into both the condition status of the system and the actions that were performed during the assessment. These deliverables need to be accurate to ensure the continued successful operation of these systems. These deliverables are maintained on paper and are either completed while conducting the assessment, which can lead to incomprehensible or damaged documents, or after the assessor conducts the assessment, in which data may be lost or recorded incorrectly due to the time between the actual assessment and the recording of the data. The assessor may also need to complete other reports and/or deliverables that can also suffer the same issues and inaccuracies as the assessment report.

Assessors tend to gravitate to the components of a system that they know best. For example, an assessor may be more technically versed regarding the electrical components of a system. This may provide for an outstanding assessment of the systems' electrical components, but may result in assessment inaccuracies or insufficient information regarding the mechanical checks. This could cause the checks on the system to be insufficient or inaccurate based on the knowledge level of the assessor, which can lead to unnecessary downtime and unforeseen expenses.

SUMMARY

All equipment will fail if not properly maintained. As such, it is imperative to check the state of the equipment, periodically. For large industrial equipment with hundreds, if not thousands of components and subcomponents, it is quite common for the equipment owner to hire a contractor to perform an assessment and evaluate the state of the equipment. The assessor relies on their expertise and specialized tools to make an accurate and thorough evaluation. As the assessor performs the assessment procedure they may record, for example, what tests they performed and whether the results were satisfactory or unsatisfactory. The assessor's feedback can then be use to generate a report on the state of the equipment. When the state of the equipment is unsatisfactory, the report can further include information for fixing any deficiencies needed for a satisfactory rating.

A conventional assessment approach involves an assessor maintaining their evaluations on paper that are either completed while conducting an assessment, which can lead to the problem of incomprehensible or damaged documents, or after the assessor conducts the assessment, in which data may be lost or recorded incorrectly due to the time between the actual assessment and the recording of the data. The assessor may also need to complete other reports and/or deliverables that can also suffer the same problems and inaccuracies as the evaluation reports.

The systems and methods for analyzing a state of equipment solve the aforementioned problems and other problems with the conventional assessment approach. In general, embodiments of the present invention limit where an evaluation can be performed and completed to where the equipment is located, i.e., the point of performance. In particular, embodiments of the present disclosure can provide documentation and reference material necessary to performing the evaluation at the point of performance; implement checks to ensure steps are completed correctly; require an assessor to enter their input during the evaluation while at the point of performance; and generate output reports based the feedback that the assessor provided during the evaluation.

Embodiments of the present disclosure further relate to digital assessment system for conducting and gathering data from an assessment or other procedural test in order to determine the status or state of equipment. The digital assessment system includes an equipment analyzer. The equipment analyzer can be a wireless receiving/transmitting device, including but not limited to a tablet computer, a portable computer, a cell phone, or other small, handheld device that is a mobile computer with a touchscreen display, circuitry, and a battery in a single device.

More specifically, disclosed embodiments relate to methods and systems of conducting assessment procedures on industrial equipment in the digital domain using the equipment analyzer as the medium. An example embodiment utilizes the development of a configuration file to create a secure database and intuitive user-interface deployed on the equipment analyzer to conduct procedural assessments on industrial systems aboard ships, for example. The example embodiments are also further applicable to any industrial system that contains a procedural assessment for use in determining current operational status and maintenance tasks required.

Embodiments of the present disclosure relate to digitizing the assessment process and providing an assessor with an intuitive user interface to complete an assessment, while providing critical reference documentation at a point of performance, instant report generation, and an ability to produce real-time data and metrics based upon assessment results. Preferred embodiments of the system are designed to utilize an equipment analyzer having a touch interface.

Examples of the equipment analyzer can contain components such as a camera, microphone, speaker, WI-FI antenna, and a BLUETOOTH communication module. The disclosed embodiments can use any and all components of the equipment analyzer in order to convey information to the assessor and gather inputs needed to complete an assessment.

In certain aspects, the invention provides an equipment analyzer for assessing a state of equipment. The equipment analyzer includes an interactive interface for arranging a plurality of selectable assessment elements. Each selectable assessment element represents an assessment procedure for evaluating a state of equipment and is linked to a respective process pipeline stored in memory. The equipment analyzer further includes a controller that activates a tool in the process pipeline in response to receiving an assessment element selection indicating an assessment procedure is being performed. The tool includes an active state for carrying out a task at a location of the equipment. The tool is configured to receive feedback regarding the task when the task is completed at the equipment location. The controller verifies whether the task is completed based on the feedback and stores the feedback in the memory.

In related aspects, the invention provides a method for assessing a state of equipment. The method includes arranging a plurality of selectable assessment elements in an interactive interface. Each selectable assessment element represents an assessment procedure for evaluating a state of equipment and is linked to a respective process pipeline stored in memory. The method further includes activating a tool in the process pipeline in response to receiving an assessment element selection indicating an assessment procedure is being performed. The tool includes an active state for carrying out a task at a location of the equipment. The method further includes receiving feedback regarding the state of the equipment when the task is completed at the equipment location. The method further includes verifying whether the task is completed based on the feedback and storing the feedback in the memory. The foregoing method can be coded as instructions that are stored in a non-transitory computer readable medium and the instructions can be executed by a processor.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION OF THE INVENTION

All equipment will fail if not properly maintained. As such, it is imperative to check the state of the equipment, periodically. For large industrial equipment with hundreds, if not thousands of components and subcomponents, it is quite common for the equipment owner to hire a contractor to perform an assessment and evaluate the state of the equipment. The assessor relies on their expertise and specialized tools to make an accurate and thorough evaluation. As the assessor performs the assessment procedure they may record, for example, what tests they performed and whether the results were satisfactory or unsatisfactory. The assessor's feedback can then be use to generate a report on the state of the equipment. When the state of the equipment is unsatisfactory, the report can further include information for fixing any deficiencies needed for a satisfactory rating.

Figure 1:
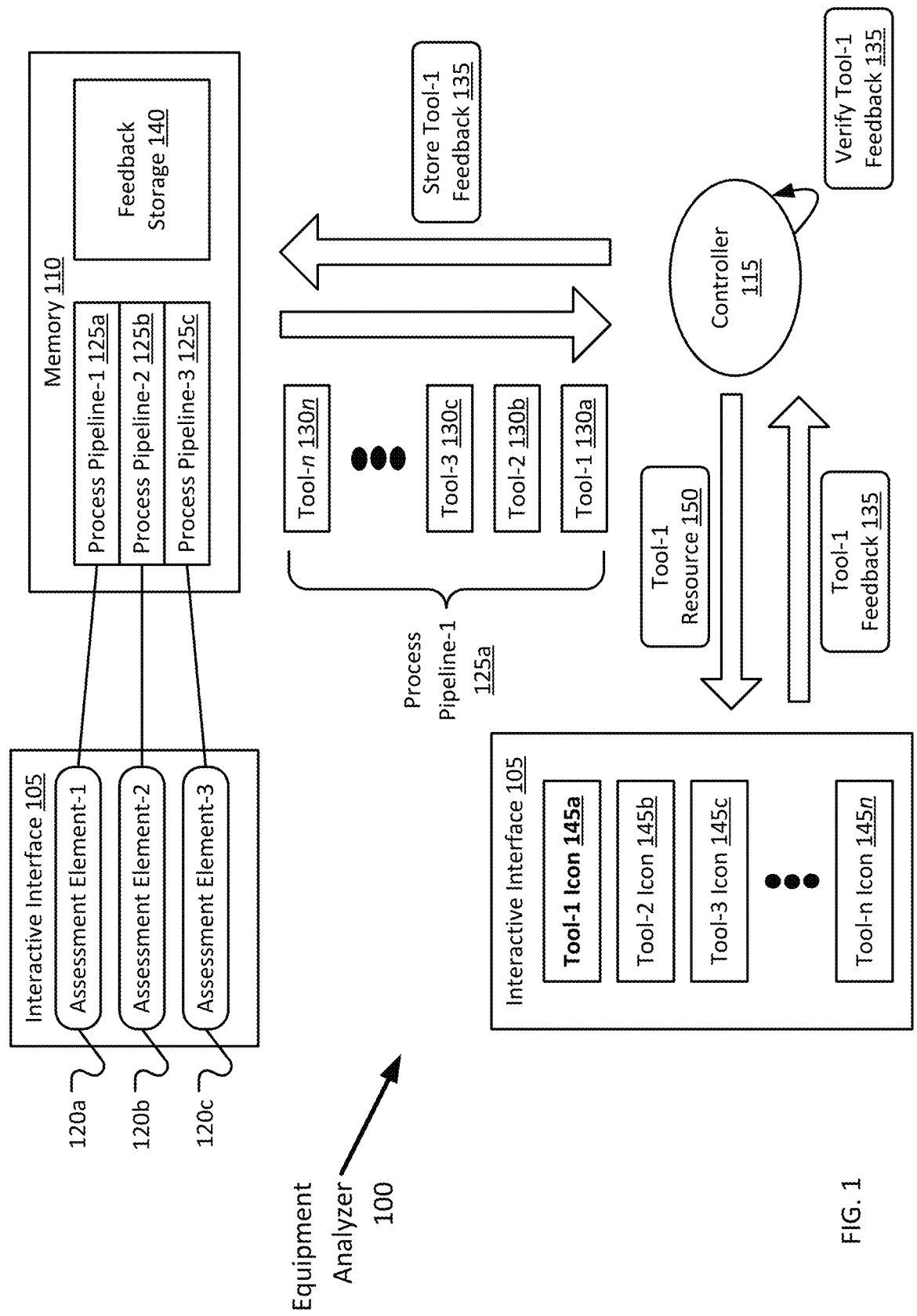
FIG. 1 is a block diagram of an equipment analyzer for evaluating the state of equipment in accordance with an example embodiment of the present disclosure.

FIG. 1 shows an example of an equipment analyzer 100 for evaluating the state of equipment. The equipment analyzer 100 includes an interactive interface 105, a memory 110, and a controller 115, communicatively coupled as shown in the figure. A user of the equipment analyzer 100 interacts with the equipment analyzer 100 using the interactive interface 105. The interactive interface 105 arranges a plurality of assessment elements 120 (shown as "Assessment Element-1" 120*a*, "Assessment Element-2" 120*b*, and "Assessment Element-3" 120*c*).

In general, each of the assessment elements 120 represents as assessment procedure or workflow for the user to carry out in evaluating the state of the equipment. For example, as shown, "Assessment Element-1" 120*a* is linked to "process pipeline-1" 125*a*, "Assessment Element-2" 120*b* is linked to "process pipeline-2" 125*b*, and "Assessment Element-3" 120*c* is linked to "process pipeline-3" 125*c*. The process pipelines 125*a*-125*c*, generally process pipelines 125, are stored in the memory 110.

The controller 115, in response to the user selecting (e.g., clicking) the assessment element 120, initiates the process pipeline 125. Each process pipeline 125 includes at least one tool 130 (shown as "tool-1" 130*a*, "tool-2" 130*b*, "tool-3" 130*c* ... "tool-n" 130*n*). A set of linked tools may be referred to as a process pipeline. Certain embodiments of the invention include a process pipeline editor for adding, updating, and delating tools in a process pipeline. Each tool 130 embodies and represents an individual step or task in the assessment procedure to be carried by the user. In operating the equipment analyzer 100, the user uses the tool 130 to carry out a particular step in evaluating the state of the equipment.

In general, the tool 130 provides the user with helpful information, such as instructions and specifications, for carrying out a given task in the evaluation and provides a way for the user to input their feedback (i.e., comments) with respect to that step. The controller 115 receives the user's feedback 135 and verifies whether that the step is completed based on the feedback 135. For example, the controller 115 checks whether the user has provided a rating or comments pertaining to the step. Upon successful verification, the controller 115 stores the user's feedback 135 into a portion reserved in the memory 110 called feedback storage 140. If the verification is not successful, the equipment analyzer 100 notifies the user that the step is not complete, and they must go back and provide their feedback in order to complete the step.

In general, the equipment analyzer 100 provides the tools 130 to the user in a manner that is helpful to the user in evaluating the state of the equipment. For example, icons 145 representing the tools to be used in evaluating the state of the equipment (shown as a "Tool-1" icon 145*a*, "Tool-2" icon 145*b*, "Tool-3" icon 145*c*, and "Tool-n" icon 145*n*) are displayed in the interactive interface 105 as a list (e.g., a vertical listing). The icons 145 can also be ordered indicating the order in which the tasks of the assessment procedure are to be done. The user can freely select any of the icons 145 to preview any of the assessing steps. The icon of the tool currently being used by the user can be made to look different than the other tool icons. For example, as shown, the current tool icon 145*a* is highlighted and the remaining tool icons 145*b*-145*n* are not highlighted. Different colors can also be used.

In some examples, one or more of the features for presenting the icons 145 described above is specified in a pipeline definition. As described in greater detail herein, the pipeline definition can be part of a larger configuration file for creating the digital environment for assessing a state of equipment. The controller 115 receives the pipeline definition or a reference to the pipeline definition as part of the initiation process described above. The controller 115 reads the pipeline definition and arranges (e.g., displays) the icons 145 in the interactive interface 105 according to the definition. In a convenient example, the interactive interface 105, the icons 145 in the interactive interface 105 as well as other interfaces and graphical user interactive elements described herein are instantiated according to templates. The controller 115 uses these templates as a "scaffold" on which to dynamically build a digital assessment system.

In another example, the controller 115 activates the tools 130 with the process pipeline 125 based on a location and proximity of the equipment analyzer 100 to the equipment being evaluated. When the user carries the equipment analyzer 100 to or close to the equipment under evaluation, for example, the controller 115 activates one or more tools 130 relevant to assessing that equipment. With the tool 130 in the active state, the user can provide feedback and set the corresponding assessing task to complete. When the user carries the equipment analyzer 100 away from the equipment under evaluation, for example, the controller 115 inactivates one or more tools 130 relevant to assessing that equipment. With the tool 130 in the inactive state, the user cannot provide feedback or set the corresponding assessing step to complete (e.g., the tool is grayed out in the interactive interface 105 and cannot be selected).

Further, when the user carries the equipment analyzer 100 away from a first equipment under evaluation and carries it to or close to a second equipment under evaluation, the controller 115 inactivates a first tool used to assess the state of the first equipment. The controller then activates a second tool used to assess the state of the second equipment. In this way, the controller 115 can change the state of a tool based on the user's progress through the assessment procedure.

The controller 115 can determine the location of the equipment analyzer 100 relative to the equipment under evaluation using any number of different location technologies. For example, the equipment analyzer 100 is equipped with an RFID reader for reading RFID tags attached, embedded or otherwise associated with the equipment under evaluation. The RFID tag includes an equipment identifier and, in some instances, can further include a tool identifier specifying which tool to use to assess the equipment. When the equipment analyzer is within range of the equipment under evaluation, the controller 115 reads the equipment identifier from the RFID tag and activates an appropriate assessing tool. The controller 115 can similarly determine the location of the equipment analyzer 100 relative to the equipment under evaluation using beacon technologies that are based on low-power BLUETOOTH or nearfield communication. For some applications, the equipment analyzer 100 is equipped with an optical scanner for reading a machinereadable representation of the equipment identifier (and in some instances the tool identifier), such as a barcode, a matrix code, and a QUICK RESPONSE CODE (QR code).

Another example of the equipment analyzer 100 is equipped with a Global Positioning System (GPS) receiver or a network interface (e.g., WI-FI interface) for receiving GPS coordinates. The equipment analyzer 100 then determines its location relative to the equipment under evaluation based on the received GPS coordinates.

By activating the tools 130 based on location and proximity of the equipment analyzer 100 to the equipment under evaluation, the controller 115 can limit the tools 130 provided to the user to those that are relevant to the equipment currently being evaluated by the user. This can reduce the likelihood that the user is overwhelmed or confused by too many tools being active at one time and can enhance user usability.

In another example, a "beacon" is attached to the equipment being evaluated by the user. The beacon is an electronic device and can be passive and unpowered. The beacon stores a key that is used to unlock the tool for evaluating the equipment. The user carrying the equipment analyzer 100 must be next to the equipment being evaluated in order to retrieve the key from the beacon and active the tool.

The location-based tool activation mechanism of the present invention can also be used to enforce a policy that every task of an assessment procedure is completed at the point of assessment and includes user feedback. For example, a tool cannot be activated and a user is not allowed to provide their feedback on a step or set it as complete unless the user is physically present at the point of evaluation. This can reduce of any inaccuracies that may result when the user waits for some time after performing the evaluation to provide their feedback and is unlikely to remember every detail. With the conventional paper-based approach to equipment assessment, this delay in providing feedback can be days or even weeks, leading to gross inaccuracies. The location-based tool activation mechanism of the present invention can also reduce the likelihood of a user falsifying that they performed an assessing step when they did not.

In some instances, the controller 115 can also request additional resources 150, such as additional computing power, additional computer processors, one or more virtual machines or additional storage space for the tool 130. The controller 115 can also request additional resources 150 to help the user carry out a task in the evaluation. For example, the controller 115 can retrieve and provide technical documents about the equipment or a component of the equipment being assessed. To further illustrate the breath of possible additional resources 150 that controller 115 can request to help the user carry out a step in the evaluation, several more examples are described below.

The controller 115 can request access to a camera associated with the equipment analyzer 100 (e.g., a camera built into the equipment analyzer 100) so the user can take still pictures/images and/or recording video of the equipment and include the images/videos with their evaluation. This feature is beneficial because such visual data may be helpful in assessing the state of the equipment. The controller 115 can request access to a microphone associated with the equipment analyzer 100 (e.g., a microphone built into the equipment analyzer 100) so the user can record noise coming from the equipment and include the recording with their evaluation. This feature is beneficial because such a recording provides aural data that may be helpful in assessing the state of the equipment. The controller 115 can request access to a temperature monitor associated with the equipment analyzer 100 (e.g., a forward looking infrared (FIR) sensor) so the user can take temperature readings and include the readings with their evaluation. The controller 115 can request access to one or more electronic sensors associated with the equipment analyzer 100 (e.g., an accelerometer, a gyroscope, and/or a magnetometer built into the equipment analyzer 100) so the user can take measurements and include the measurements with their evaluation.

Figure 2:
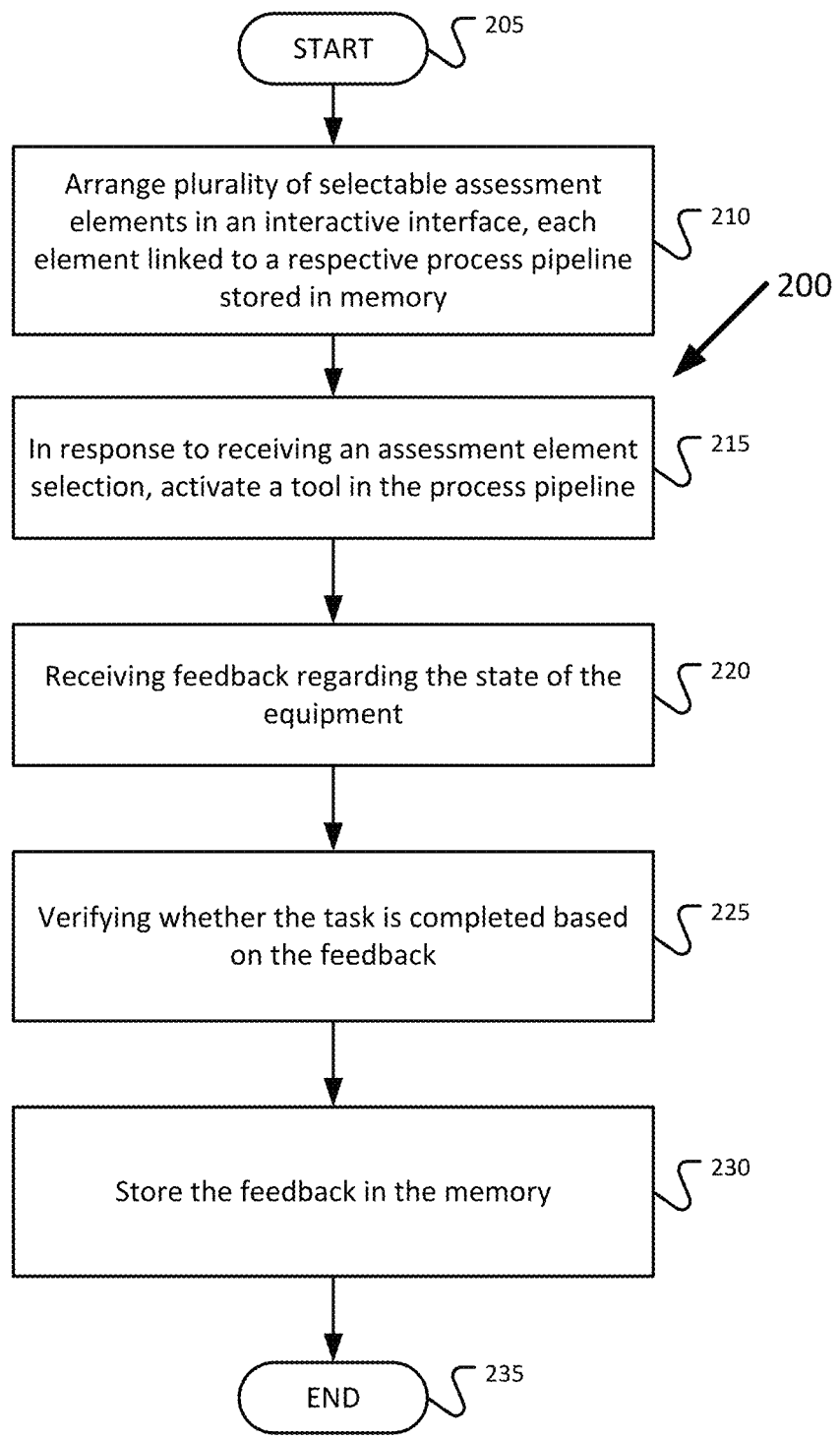
FIG. 2 is a flowchart of a method for evaluating the state of equipment in accordance with an example embodiment of the present disclosure.

FIG. 2 shows an example process 200 for evaluating the state of equipment. The process 200 starts (205) and arranges (210) a plurality of selectable assessment elements in an interactive interface. Each element represents an assessment procedure for evaluating a state of equipment and is linked to a respective process pipeline stored in memory. The process 200 activates (215) a tool in the process pipeline in response to receiving an assessment element selection indicating an assessment procedure is being performed. The tool includes an active state for carrying out a task at a location of the equipment. The process 200 receives (220) feedback from the user regarding the state of the equipment at the equipment location. The process 200 verifies (225) whether the task is completed based on the feedback. The process 200 stores (230) the feedback in the memory and the process 200 ends (235). The foregoing process 200 can be coded as instructions that are stored in a non-transitory computer readable medium and the instructions can be executed by a processor.

As one skilled in the art would recognize as necessary or best-suited for performance of the methods of the invention, systems of the invention include one or more wireless receiving/transmitting devices that include one or more processors (e.g., a central processing unit (CPU), a graphics processing unit (GPU), etc.), computer-readable storage devices (e.g., main memory, static memory, etc.), or combinations thereof which communicate with each other via a bus. A wireless receiving/transmitting device generally includes at least one processor coupled to a memory via a bus and input or output devices.

Memory preferably includes at least one tangible, non-transitory medium capable of storing: one or more sets of instructions executable to cause the system to perform functions described herein (e.g., software embodying any methodology or function found herein); data (e.g., embodying any tangible physical objects such as the instructions or specifications for evaluating a state of equipment; for feedback inputted by user regard the state of equipment); or both.

While the computer-readable medium can in an exemplary embodiment be a single medium, the term "computer-readable medium" should be taken to include a single medium or multiple media (e.g., a centralized or distributed database, and/or associated caches and servers) that store the instructions or data. The term "computer-readable medium" shall accordingly be taken to include, without limit, solid-state memories (e.g., subscriber identity module (SIM) card, secure digital card (SD card), micro SD card, or solid-state drive (SSD)), optical and magnetic media, and any other tangible storage media.

Input/output devices according to the invention may include a video display unit (e.g., a liquid crystal display (LCD) or a cathode ray tube (CRT) monitor), a printer, an alphanumeric input device (e.g., a keyboard), a cursor control device (e.g., a mouse or trackpad), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Figure 3:
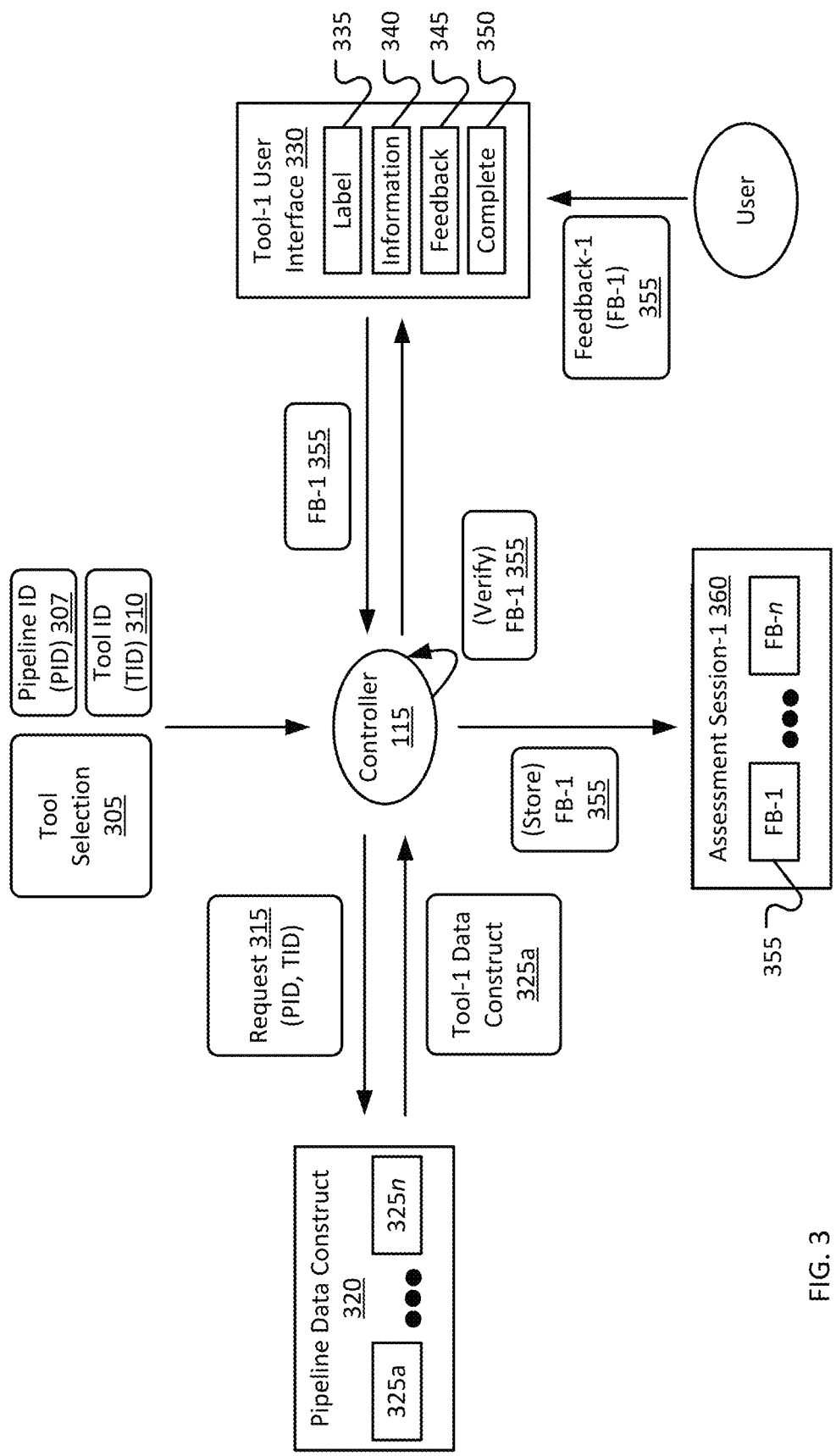
FIG. 3 is a block diagram of a controller activating a tool and a user interacting with the tool in accordance with an example embodiment of the present disclosure.

FIG. 3 shows the controller 115 receiving a tool selection 305. In this example, a user is performing a task of an assessment procedure and selects "tool-1" to perform that task. The tool selection 305 includes a pipeline identifier 307 for the assessment procedure and a tool identifier 310 for "tool-1". The controller 115 issues a request 315 for "tool-1" with the pipeline identifier 307 and the tool identifier 310 as request parameters.

The pipeline identifier 307 references a pipeline data construct 320 stored in memory, which represents the assessment procedure. The pipeline data construct 320 is a logical structure for organizing data relating to the tools for assessing the state of the equipment in accordance with the procedure. Using data security techniques, the pipeline data construct 320 can be stored with other pipeline data constructs representing other assessment procedures in shared memory without the tool data comingling.

Each tool in the pipeline is represented by a tool data construct 325 stored in memory (shown as tool data constructs 325a ... 325n). The tool identifier 310 references the tool data construct 325a for "tool-1". In a convenient example, the tool data constructs 325 are stored at consecutive memory addresses for fast access. As described in greater detail herein, the controller 115 uses the tool data construct 325 to create a tool user interface 330 in the interactive interface 105 (of FIG. 1). In some examples, the tool user interface 330 in an instances the tool data construct 325.

The user sees and interacts with the tool user interface 330 while evaluating the state of the equipment. The tool user interface 330 includes a label 335 identifying the tool to the user. The label 335 can be any combination of alpha-numerical characters. In practice, however, the label 335 will typically correspond to an evaluating step (e.g., "Slide Watertight Door Evaluation") so that the user can readily identify whether they are using the right tool for that step.

The tool user interface 330 further includes information 340 to help the user perform the evaluating step, such as instructions, specifications, and other documentations (e.g., "Tighten bolts to fifteen foot pounds using a 7/16th socket wrench"). The tool user interface 330 includes a feedback section 345 for the user to input their feedback on the state of the equipment. For example, the feedback section 345 includes a rating switch or similar graphical user interactive (GUI) element that the user can change between satisfactory and unsatisfactory. The feedback section 345 can include (or in addition to the rating switch) a text area where the user can write in their comments.

The tool user interface 330 further includes a complete button 350 or similar GUI element that the user can select when they complete the assessing task. The controller 115 responds to the selection of the complete button 350 and verifies whether by the user has provided feedback on "step-1" of an assessment procedure, shown as "feedback-1" or "FB-1" 355. The verification logic can include checking that the user has written down comments when they rate the state of the equipment as unsatisfactory. This verification mechanism can enforce a policy that a step in the assessment procedure cannot be completed unless the user provides feedback. Accordingly, it is more likely the user will describe why the state of the equipment is unsatisfactory and what needs to done (e.g., repaired or replaced) to change the equipment state to satisfactory. In contrast, a conventional paper evaluation form lacks the ability to check whether the state of the equipment has been properly and fully documented.

The controller 115 creates an assessment session 360 for storing the feedback 330. In a convenient example, the assessment session 360 is indexed by the pipeline identifier 307. The assessment session 360 is a logical persistent store for saving user feedback provided during the assessment procedure. This allows a user to stop in the middle of the assessment procedure, save their feedback for any step or steps they have completed so far, and then resume the assessment procedure at a later time. In some instances, the assessment session 360 is implemented by the feedback storage 140 (of FIG. 1) or other secured database.

When a user accesses an existing assessment procedure (completed or partially completed) to review feedback, for example, the controller 115 pulls the persistent store session data from the assessment session 360 (e.g., using the pipeline identifier 307 and tool identifier 310). In some instances, the assessment session 360 is implemented by the feedback storage 140 (of FIG. 1) or other secured database. Accordingly, the controller 115 can use secured data calls to retrieve user feedback and other sensitive data in a data repository. As described in greater detail herein, the persistent store session data can also be used to generate custom reports or final deliverables.

Figure 4:
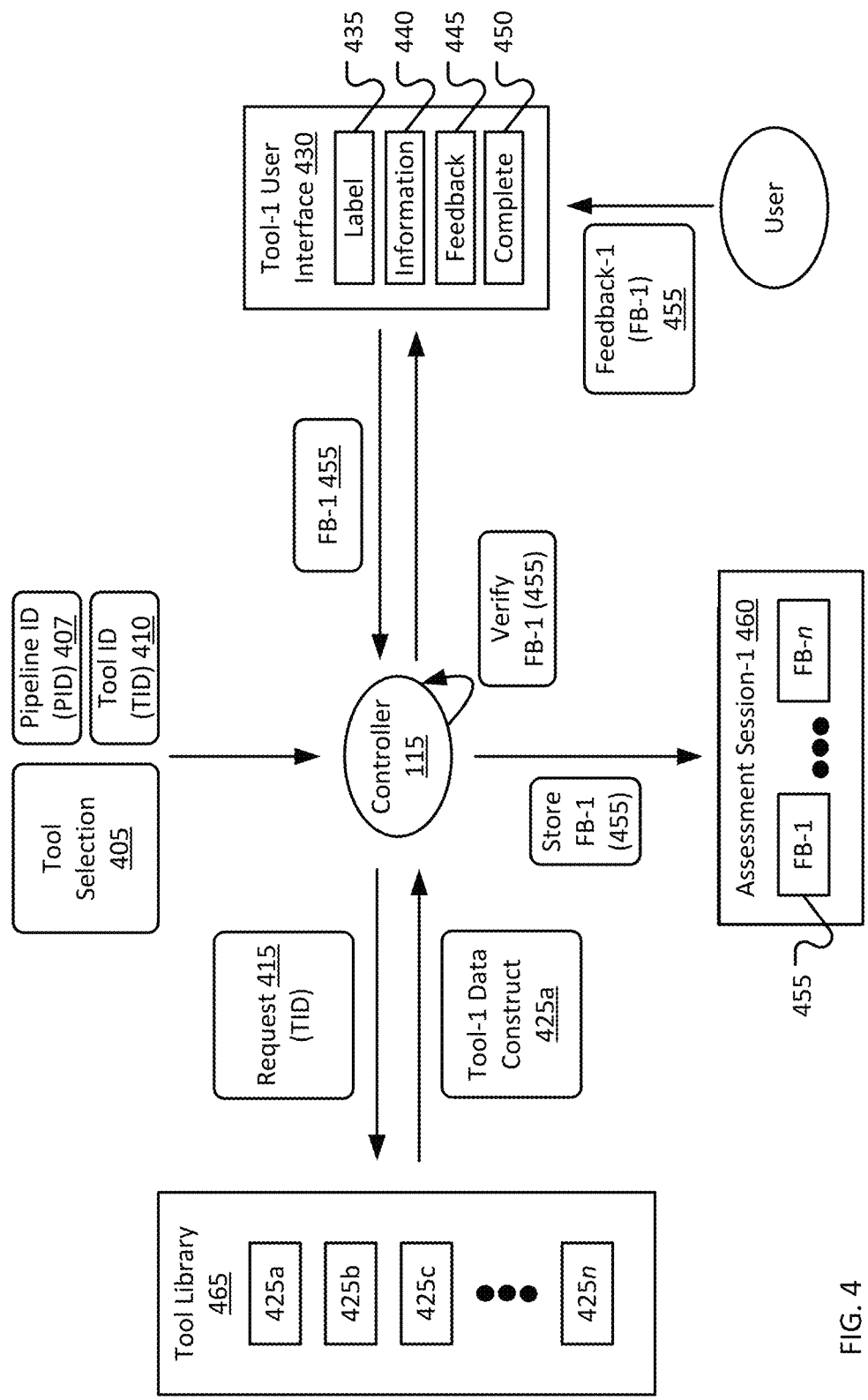
FIG. 4 is a block diagram of a controller activating a tool and a user interacting with the tool in accordance with an example embodiment of the present disclosure.

FIG. 4 shows the controller 115 receiving a tool selection 405. In this example, a user is performing a step of an assessment procedure and selects "tool-1" to perform the step. The tool selection 405 includes a pipeline identifier 407 for the assessment procedure and a tool identifier 410 for "tool-1". The controller 115 issues a request 415 for "tool-1 with the tool identifier 410 as the request parameter.

The tool identifier 407 references a tool data construct 420 stored in a tool library 465. The tool library 465 can contain a number tool data constructs (shown as tool data constructs 425a, 425b, 425c ... 425n). Each tool data construct 420 represents of tool that can be used in any number of pipelines to evaluate a wide variety of equipment. Accordingly, a pipeline for an assessment procedure can built, dynamically, by using and reusing tools from the tool library. This can reduce the amount of storage that may be needed to save pipelines for a large number of assessment procedures. Consider the example of assessing the state of one hundred watertight windows located throughout a ship. Assessing the state of each window requires a user to perform the same set of tasks. One approach is to store one hundred pipelines—one stored pipeline to evaluate one watertight window. Using the space-saving approach described above, the controller 115 dynamically builds a watertight window evaluation pipeline each time the user evaluates a watertight window and tears down the pipeline when the user is done with the evaluation. Another benefit to building evaluation pipelines, dynamically, is that a change to a tool does not require changing multiple copies of the tool or pipelines.

As described in greater detail herein, the controller 115 uses the tool data construct 425 to create a tool user interface 430 in the interactive interface 105 (of FIG. 1). In some examples, the tool user interface 430 in an instances the tool data construct 425.

The user sees and interacts with the tool user interface 430 while evaluating the state of the equipment. The tool user interface 430 includes a label 435 identifying the tool to the user. The label 435 can be any combination of alpha-numerical characters. In practice, however, the label 435 will typically correspond to an evaluating step (e.g., "Slide Watertight Door Evaluation") so that the user can readily identify whether they are using the right tool for that step.

The tool user interface 430 further includes information 440 to help the user perform the evaluating step, such as instructions, specifications, and other documentations (e.g., "Tighten bolts to fifteen foot pounds using a 7/16th socket wrench"). The tool user interface 330 includes a feedback section 445 for the user to input their feedback on the state of the equipment. For example, the feedback section 445 includes a rating switch or similar graphical user interactive element (GUI) that the user can change between satisfactory and unsatisfactory. The feedback section 445 can include (or in addition to the rating switch) a text area where the user can write in their comments.

The tool user interface 430 further includes a complete button 450 or similar GUI element that the user can select when they complete the assessing step. The controller 115 responds to the selection of the complete button 450 and verifies whether by the user has provided feedback on "step-1" of an assessment procedure, shown as "feedback-1" or "FB-1" 455. The verification logic can include checking that the user has written comments when they rate the state of the equipment as unsatisfactory. This verification mechanism can enforce a policy that a step in the assessment procedure cannot be completed unless the user provides feedback. Accordingly, it is more likely the user will describe why the state of the equipment is unsatisfactory and what needs to done (e.g., repaired or replaced) to change the equipment state to satisfactory. In contrast, a conventional paper evaluation form lacks the ability to check whether the state of the equipment has been properly and fully documented.

The controller 115 creates an assessment session 460 for storing the feedback 430 pertaining to the assessment procedure. In a convenient example, the assessment session 360 is indexed by the pipeline identifier 407. The assessment session 460 is a logical persistent store for saving user feedback provided during an assessment procedure. This allows a user to stop in the middle of the assessment procedure, save feedback for any step or steps they have completed so far, and then later on resume the assessment procedure. In some instances, the assessment session 460 is implemented by the feedback storage 140 (of FIG. 1) or other secured database.

When a user accesses an existing assessment procedure (completed or partially completed) to review feedback, for example, the controller 115 pulls the persistent store session data from the assessment session 460 (e.g., using the pipeline identifier 307 and tool identifier 310). In some instances, the assessment session 460 is implemented by the feedback storage 140 (of FIG. 1) or other secured database. Accordingly, the controller 115 can use secured data calls to retrieve user feedback and other sensitive data in a data repository. As described in greater detail herein the persistent store session data can also be used to generate custom reports or final deliverables.

Some examples of the tool user interface 330 of FIG. 3 and the tool user interface 430 of FIG. 4 are interactive evaluation forms that mimic paper documents conventionally used in the equipment assessment process. However, being in the digital domain, the interactive evaluation forms provide functions not otherwise available with paper documents. For example, the interactive evaluation forms can be updated in real-time (or near real time) with information for performing an evaluating step. In this way, a user is relying on the most up to date information to assess a state of equipment. As another example, completion of an interactive evaluation form can be dependent on completion of other interactive evaluation forms. An evaluating step can be broken down into smaller steps or "sub-steps." The interactive evaluation form for the evaluating step cannot be completed until the interactive evaluation forms for the sub-steps are completed. As yet another example, the interactive evaluation forms can only be activated and able to be completed (e.g., fillable) when a user is physically present at the point of evaluation. These digital features of the interactive evaluation forms can be used to enforce policies that ensure that best practices are performed. As a result, more consistent and reliable evaluations can be achieved and, in turn, save time and money.

In convenient example, the equipment analyzer can encode the feedback provided by the user (e.g., 355 of FIG. 3) into a representation that can be read by a device, referred to as a "feedback reader". The representation or "code" includes data needed to recreate the user's feedback on the feedback reader, including any data collected by the user during the evaluation and saved with their feedback. For example, the equipment analyzer encodes images taken by the user of the equipment into the code. For security reasons, the feedback reader recreates the evaluation and other data, temporarily, and can delete it when the person using the feedback reader is done studying the evaluation (or after some pre-defined period of time). Accordingly, the feedback reader may not store any sensitive data.

The code is then attached to the equipment. For example, the code is printed onto a sticker that can be affixed to the equipment when the evaluation is completed. In another example, the code is "burned" into a solid state memory device on a thin-film carrier that can be affixed to the equipment when the evaluation is completed. In addition to carrying the code, the sticker, for example, can also serve as a visual indicator that the equipment has been inspected. Examples of the code include a matrix code or QUICK RESPONSE (QR) code The feedback reader reads the code, decodes it, and recreates the user's feedback. In some examples, the feedback reader includes or is associated with an optical scanner to read the code. The feedback reader can include a screen for displaying the recreated feedback, including any visual data collected and saved by the user, such as images and video recordings of the equipment. The feedback reader can also include a speaker for playing back any aural data collected and saved by the user, such as an audio record of noise generated by the equipment.

In a convenient example, prior to encoding, the equipment analyzer compresses the user's feedback and any data collected by the user during the evaluation and saved with the feedback. Accordingly, the code represents a compresses version the user's feedback and saved data. After reading the code and decoding it, the feedback reader decompresses the user's feedback and the saved data to recreate the user's evaluation.

Accordingly, with the aforementioned coding technology, a user's evaluation of a piece of equipment is "stored" right on the equipment and can be accessed without having to use the equipment analyzer, which was used to make the evaluation.

In certain situations, the coding feature can be beneficial or even critical to those who depend on equipment working properly. Consider a use case example of equipment onboard a ship that is deployed at sea and the equipment breaks down. A sailor equipped with the feedback reader scans the code on the sticker that is affixed to the equipment. The feedback reader recreates the user's evaluation so that the sailor can see when the equipment was last inspected and the result of the inspection. Armed with this information, the sailor can then, for example, proceed to make the necessary repairs at sea. Once the sailor is done using the recreated feedback, it is deleted from the feedback reader. In this way, data security can be maintained.

Advantageously, the user's evaluation is stored on both the equipment analyzer used to make the evaluation and on the equipment itself. This can reduce the likelihood of a single "point of failure". Even if the equipment analyzer breaks, is lost or stolen, the user's evaluation can still accessed by reading the code with the feedback reader. It is conceivable for one equipment analyzer to store sensitive information on a myriad of equipment making the analyzer highly valuable. In some instances, the approach of recreating an evaluation from a code attached to a piece of equipment can reduce the need (and cost) for a robust mechanism for tracking and maintaining equipment analyzers.

Figure 5A:
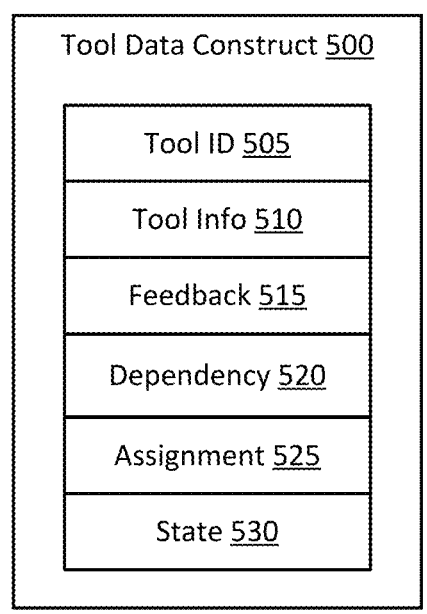
FIGS. 5A-5C are block diagrams of tool data constructs in accordance with example embodiments of the present disclosure.

FIG. 5A shows an example tool data construct 500 used by the controller 115 to create a tool user interface, such as the tool user interface 330 of FIG. 3 or the tool user interface 430 of FIG. 4. The tool data construct 500 includes a tool identifier (ID) field 505, a tool information field 510, a feedback field 515, a dependency field 520, an assignment field 525, and a state field 530 each of which are described in greater detail below.

The tool identifier field 505 contains an identifier that the controller 115 (of FIGS. 3 and 4) uses to find the tool data construct 500 stored in memory. The tool information field 510 contains the name of the tool for labelling the tool user interface. The tool name can be any combination of alphanumerical characters. In practice, however, the tool name will typically correspond to an evaluating step (e.g., "Sliding Watertight Door Evaluation") so that the user can readily identify whether they are using the right tool for that step. The tool information field 510 further contains instructions, specifications, or a link to such information that is displayed in the tool user interface. Seeing this information in the tool user interface can help the user perform the evaluating step. The feedback field 515 contains one or more settings for creating a rating switch or similar graphical user interactive (GUI) element in the tool user interface. The user can provide their feedback on the state of equipment, for example, by toggling the rating switch between satisfactory and unsatisfactory. The setting can also be for creating a text area in the tool user interface where the user can write in their comments.

The state field 530 indicates the state of a tool, for example, inactive, active, and complete. The controller 115 updates the tool state as the user is using a tool. For example, when the user selects a tool, the controller 115 changes the tool state from inactive to active. In some instances, this state change causes (triggers) the controller 115 to render or otherwise generate the tool user interface in the interactive interface 105 (of FIG. 1). When the user is done with the inspection and selects the complete button 350 (of FIG. 3), the controller 115 changes the tool state from active to complete. Accordingly, the state of the tool is maintained and can be used to monitor tool usage. Furthermore, the state of the pipeline and, in general, the user's progress can be determined from the state of each tool in the pipeline.

The dependency field 520 generally allows dependencies between tools to be defined. The dependencies may include, for example, a parent tool setting and a child tool setting to create a direct parent/child relationship between tools to ensure steps in the assessment procedure are completed in the correct order. An example scenario of the parent/child interaction would be the inspection of an energized circuit breaker. The parent step would be "Secure power to the circuit breaker". The child step would be "Conduct an assessment of the circuit breaker". The parent step in this scenario would ensure the user secures power to the circuit breaker before conducting any assessment of the circuit breaker, which would reduce the risk of the user getting shocked by the circuit breaker.

Figure 5B:
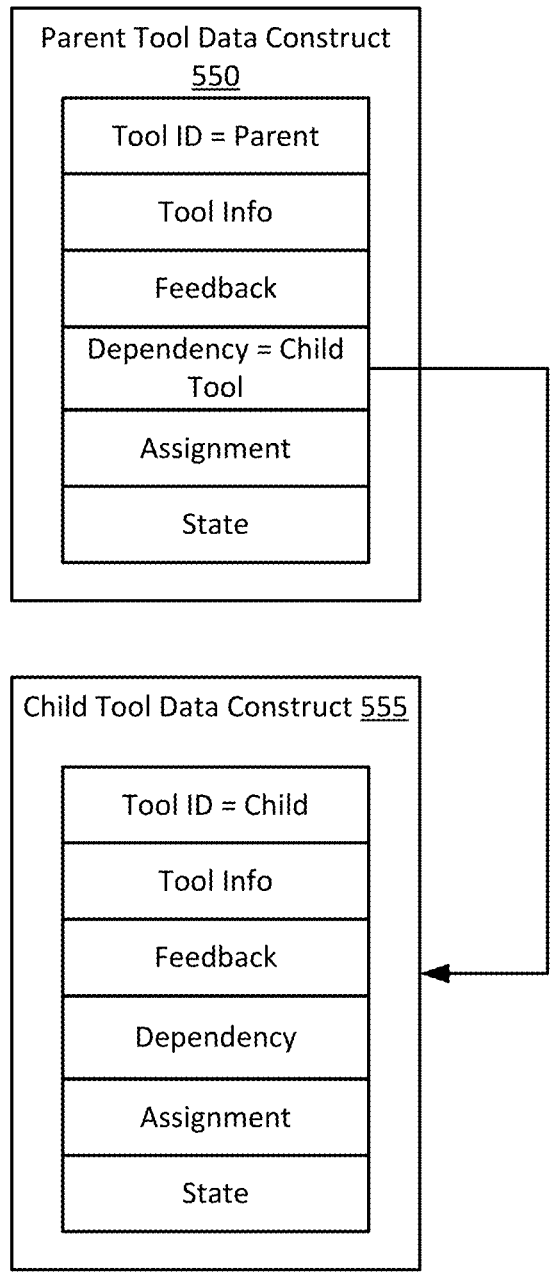

FIG. 5B shows a parent tool data constructs 550 of a tool used in a parent step (shown as "Tool ID=Parent") and a child tool data constructs 555 of a tool used in a child step (shown as "Tool ID=Child"). The dependency field for the parent tool data constructs 550 is set to the child tool data constructs 555 (shown as "Dependency=Child Tool"). This links the parent step to the child step to ensure that the parent step cannot be completed until the child step is completed. The dependency field for the parent tool data constructs 550 can be set to multiple child tool data constructs representing multiple tools used in the children steps. In this way, a parent step can be linked with multiple children steps to ensure that the parent step cannot be completed until all children steps are completed.

Figure 5C:
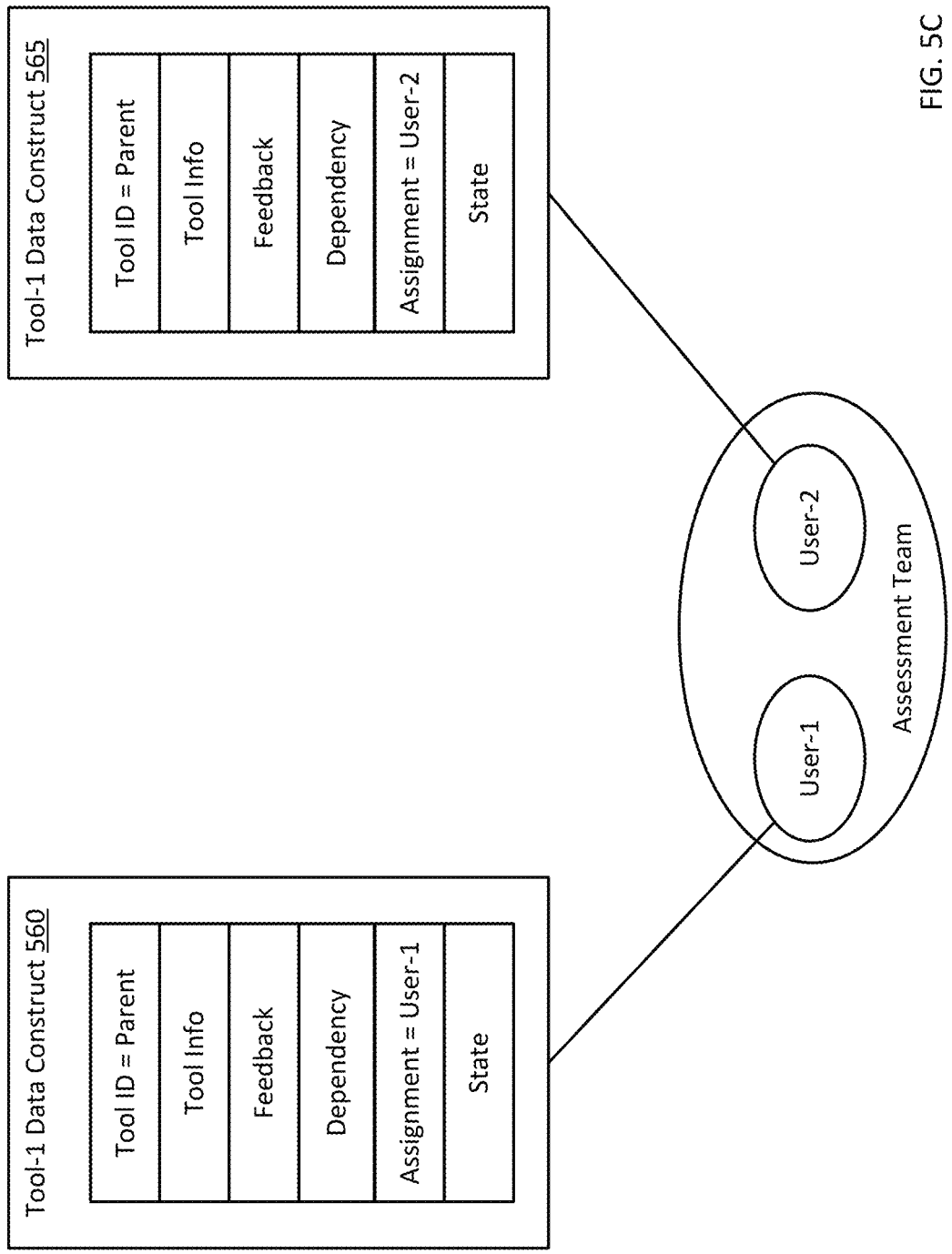

The assignment field 525 is used to designate a step to be completed by a specific user. This allows an assessment procedure to be broken down into smaller "sub-assessment procedures", each assigned to a different user. Additionally, the sub-assessment procedures can be performed at the same time and completed at different times. FIG. 5C shows an assessment team of two users, User-1 and User-2. The assessment team evaluates a state of equipment according to an assessment procedure that has two steps. A process pipeline for the assessment procedure includes two tools; Tool-1 for performing one of the two evaluating steps and Tool-2 for performing the other evaluating step. The figure shows a tool data construct 560 for Tool-1 and a tool data construct 565 for Tool-2. The data construct 560 for Tool-1 includes an assignment field set to User-1 (shown as "Assignment=User-1"). This links Tool-1 to User-1, who uses Tool-1 to perform one of the two steps in the assessment procedure. The data construct 565 for Tool-2 includes an assignment field set to User-2 (shown as "Assignment=User-2"). This links Tool-2 to User-2, who uses Tool-2 to perform the other assessing step. In this way, a large assessment procedure with many individual steps can be broken down into smaller sub-assessment procedures, each with a number of steps that can be readily handled by a single user.

A process pipeline (e.g., the process pipeline-1 125a of FIG. 1) can be represented by a directed graph with nodes associated with tools (steps) in the pipeline (process) and branches between the nodes representing a flow of the tools (steps) in the pipeline (process). A directed graph can include nodes representing tools (steps) in a pipeline (process) where the nodes branch to other nodes based on conditions, such as where a node branches to first node (e.g., tool 1) for a true condition and to a second node (e.g., tool 2) for a false condition. In a preferred example, the process pipeline is implemented as a directed acyclical graph having topological ordering such that every branch is directed from an earlier node (i.e., a tool for a task to be performed earlier) to a later node (i.e., a tool for a task to be performed later) in a sequence.

Referring to FIGS. 6A-6D the following is an example of a user (e.g., an assessor) using an equipment analyzer (e.g., the equipment analyzer 100 of FIG. 1) to evaluate the state of a sliding watertight door on board the United States aircraft carrier USS Nimitz. The sliding watertight door separates the engine room from the rest of the ship. In an emergency, the door automatically slides shut to prevent water from entering and flooding the engine room.

The sliding watertight door is a heavy steel door with sets of heavy duty rollers on the top and bottom of the door. The rollers ride in tracks in the floor and in the ceiling. Assessing the state of the door includes making sure the bolts fixing the rollers to the door are properly tightened and the rollers are lubricated. The assessment also includes clearing the tracks of any debris that might prevent the door from sliding shut.

Figure 6A:
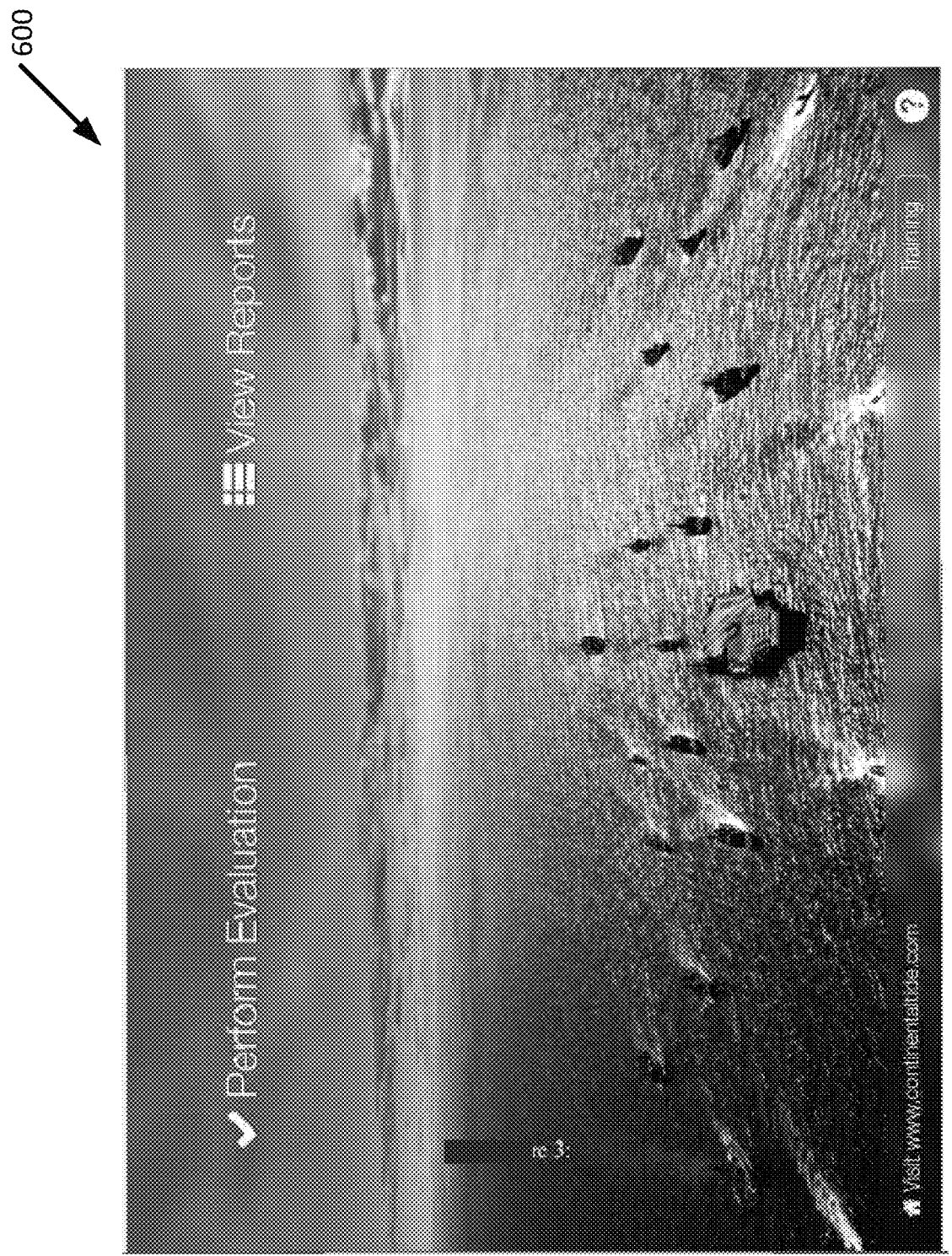
FIGS. 6A-6D are views of example screens provided by an equipment analyzer for evaluating the state of equipment in accordance with example embodiments of the present disclosure.

The user starts the equipment analyzer and is presented with an example home page 600 shown in FIG. 6A. The "Perform Evaluation" text can be selected by the user to transition to a classification screen. The "View Reports" text can be selected by the user to transition to a reports screen. The "Training" button links to any applicable training videos or reference documents. The "?" icon will access help screens for navigating the user interface.

Figure 6B:
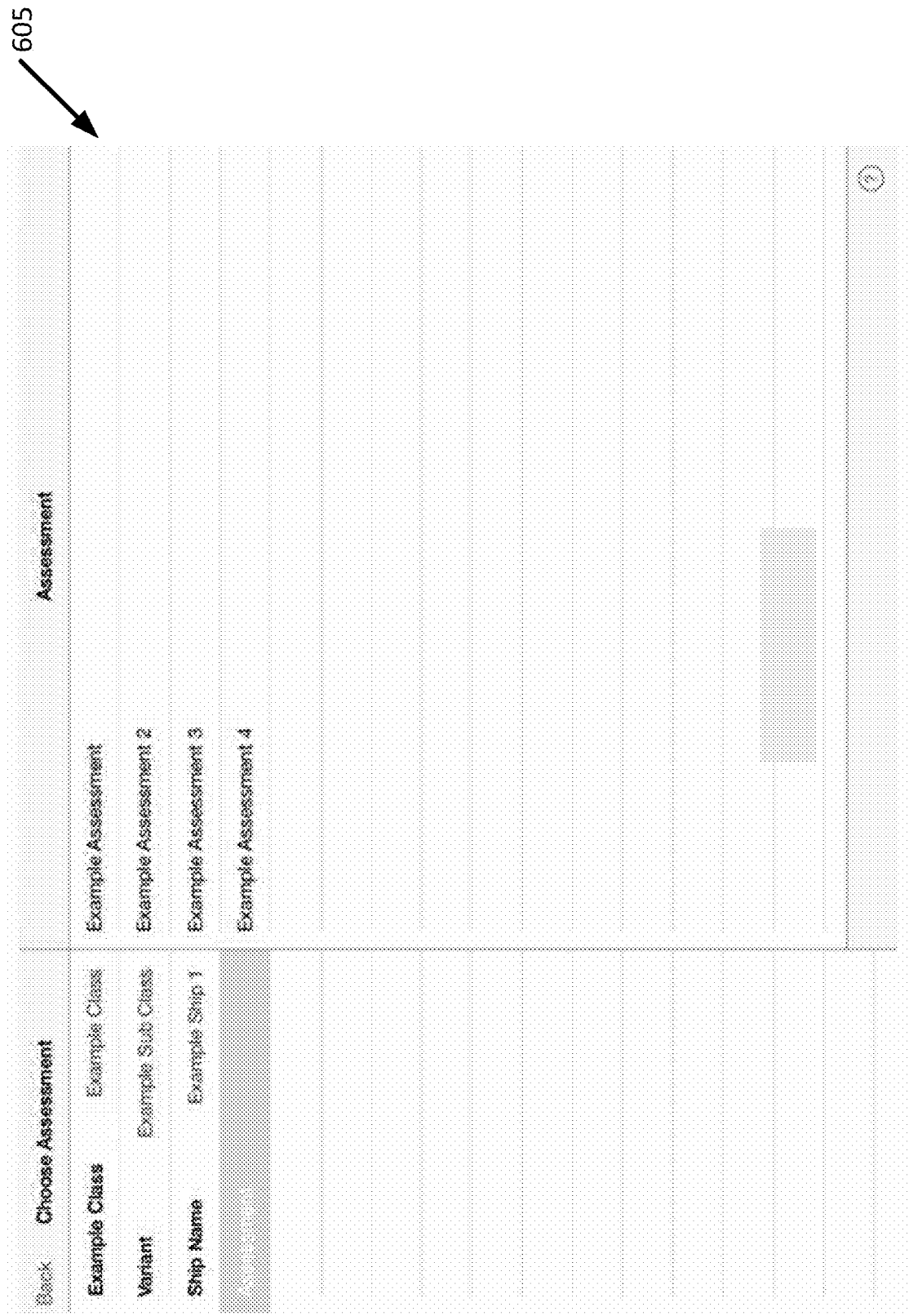

The user selects "Perform Evaluation" and is presented with an example classification screen 605 shown in FIG. 6B. In general, the classification screen 605 allows the user to have access to all assessment procedures within one electronic device, and the ability to conduct any assessment at will without losing information and data gathered via another assessment. The classification screen 605 is split into two sides of a cohesive interface. One side of the classification screen 605 is a "directory" and the other side of the classification layout screen includes all "available options" related to a current level in the directory. As the assessor makes selections within the available options screen, the directory will down-select to more specific information in accordance with the selections by the assessor.

As shown, the classification screen 605 is used to perform configuration management for data analytics and metrics. On the left hand side of the classification screen 605 under the "Choose Assessment" heading is the classification directory. The bold text represents the titles of the different levels of the directory (shown as "Example Class", "Variant", and "Ship Name"). As the list progresses downward, the directory is becoming more specific. The text next to the titles represents the user's selection for that specific level of the directory (shown as "Example Class", "Example Sub Class", and "Example Ship 1"). In this example, the user makes the following choices: Class=Ship; Variant=Aircraft Carrier; and Ship Name=USS Nimitz.

The right side of the classification screen 605, under the "Assessment" heading, includes selections available to the user for a particular level in the directory (shown as "Example Assessment 1", "Example Assessment 2", "Example Assessment 3", and "Example Assessment 4"). The heading "Assessment" is derived from the title of the level that the user currently has selected on the left side of the classification screen 605. Once the user reaches the bottom of the directory and makes a last selection, the classification screen 605 transitions to an evaluation screen of the procedure. In this example, user selects "Engine Room Sliding Watertight Door Assessment" to evaluate the state of the sliding watertight door separating the engine room from the rest of the ship.

Figure 6C:

FIG. 6C shows an example evaluation screen 610. The left side of the evaluation screen 610, under the "Example Assessment" heading, is a navigation interface 615. The heading "Example Assessment" comes from an assessment selection made by the user on the previous classification screen 605. The navigation interface 615 contains the assessing steps for a selected assessment. Each of the assessing steps is performed using a tool that can be activated based on the location and proximity of the user to the equipment being evaluated referred to as the "point of evaluation".

In the right side interface of the evaluation screen 610, under the heading "1.01—Example Step", an activated tool provides step specific information needed to complete the current step in the assessment procedure. The heading comes from the assessing step selected by the user from the navigation interface 615, which can be visualized by highlighted text or other cues.

In this example, the user is standing next to the engine room sliding watertight door and the "Check Roller Bolts" tool is active. The activated tool provides information for checking whether the bolts fastening the rollers to the sliding door are properly tightened, for example, "Tighten roller bolts to fifteen foot pounds, using a 7/16th socket wrench." The activated tool also provides a user a means for providing their feedback, which can include a rating toggle button or typed input, and a comments section for the user to capture notes pertaining to the current step. As shown, there is a step complete button that functions as a verification step that all necessary information has been filled out. For example, the verification logic can include checking that the user has written comments when they rate the state of the equipment as unsatisfactory. This verification mechanism can enforce a policy that a step in the assessment procedure cannot be completed unless the user provides feedback. Accordingly, it is more likely the user will describe why the state of the equipment is unsatisfactory and what needs to done (e.g., repaired or replaced) to change the equipment state to satisfactory.

At the bottom of the screen is a toolbar. The Bookmark icon allows the user to bookmark steps for quick reference. The Sticky Note icon contains links to all reference documentation that is pertinent to the assessment at this specific step. The Notepad icon contains an area where the user can capture general notes or reminders. The user can select (e.g., click) the "?" icon to access help screens to answer user questions about aspects of the equipment analyzer.

Figure 6D:
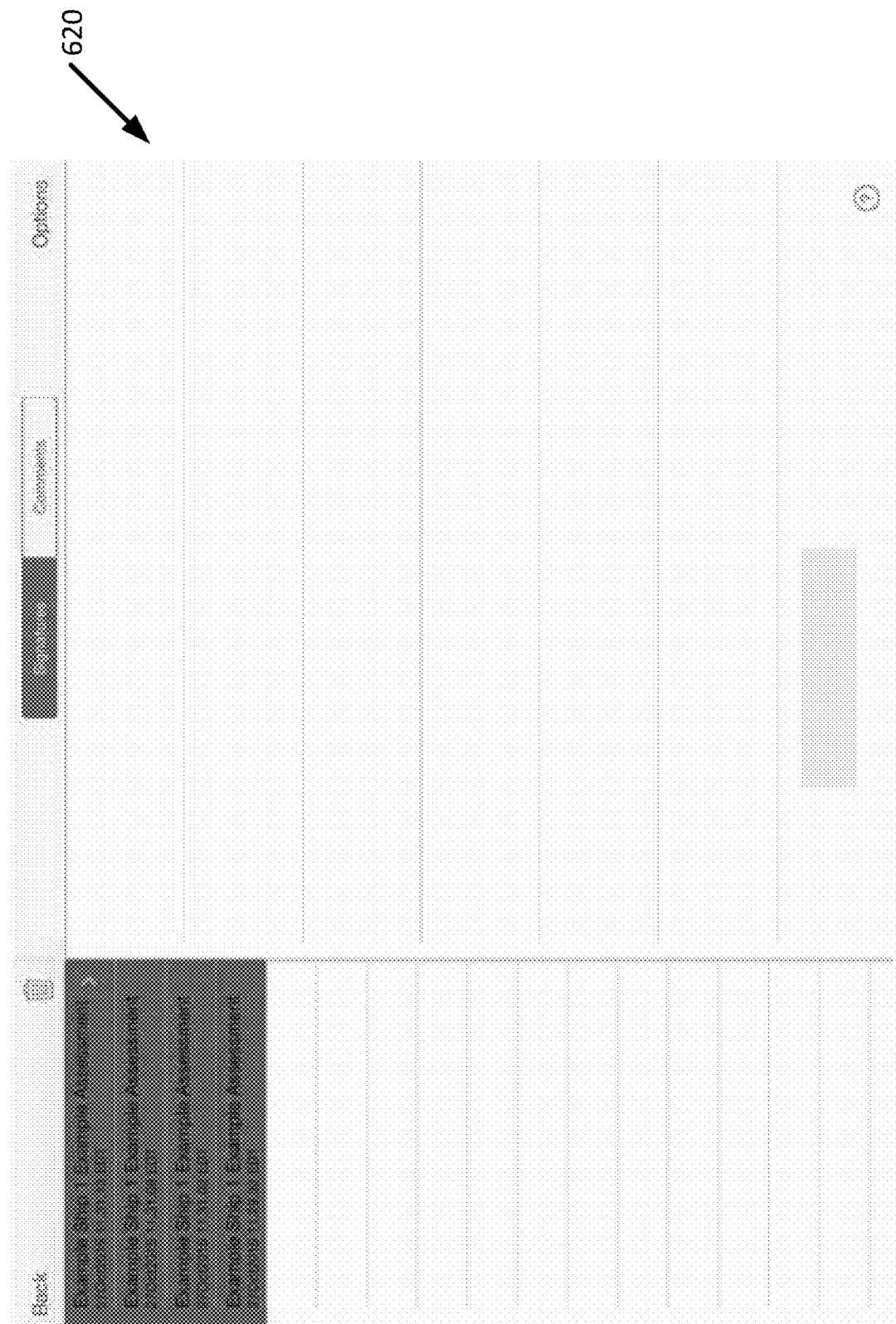

FIG. 6D shows an example reports screen 620. The left side of the reports screen 620 contains started or fully completed assessment procedures. The right side of the reports screen 620 contains evaluation information pertaining to the selected assessment procedure. For example, the reports screen 620 shows the feedback provided by the user during the assessment procedure, which is stored in the assessment session 360 (of FIG. 3).

The user can also use the reports screen 620 to generate complete reports and/or deliverables that are intended to provide feedback on the state of equipment. These report deliverables can include but are not limited to: Condition Reports, Trip Reports, Daily Reports, Data Metrics, Data Analytics, and Recommended Resolutions. The report deliverables also range in magnitude from a one-page report to multiple reports that are numerous pages.

The user can then select the assessment procedure they have completed and generate a final deliverable that is customized to meet deliverable needs. The user can also generate metrics and analytics based upon certain criteria provided by the user. These deliverables can be transmitted to an approved and secured remote computing station. For example, the deliverables can be transmitted via a reporting email, using a BLUETOOTH connection to another electronic device, air printed, or via a direct communication link.

The report deliverables are intended to provide a comprehensive view into both the condition of the equipment and the actions that were performed during the assessment. Additionally, these report deliverables are intended to be accurate to ensure the continued successful operation of the equipment. For example, the location-based tool activation mechanism of the present invention can enforce a policy that every step of an assessment procedure is completed at a point of assessment and includes user feedback. A tool cannot be activated and a user is not allowed to provide feedback on a task or set it as complete unless the user is physically present at the point of evaluation. This can reduce of any inaccuracies that may result when the user waits for some time after performing the evaluation to provide their feedback and is unlikely to remember every detail. It can also reduce the likelihood of a user falsifying that they performed an assessing step when they did not.

Security can also be added to the assessment system described herein (including, for example, the equipment analyzer 100 of FIG. 1) via an authenticator. The authenticator can be, for example a Public Key Infrastructure (PKI) reader that reads PKI cards. A PKI card contains information specific to the user of the card with items such as: user passcode, user fingerprint, and user contact information. By using either a built in or attached Department of Defense (DoD) approved PKI reader, the system (including, for example, the assessment application and feedback database) can be encrypted using any or all of this data on the PKI card. The information is also embedded into a Configuration File (described later in greater detail), so the system can compare the card values and the user entered values to ensure everything is accurate. The system would then be accessible only when the specific card used to encrypt the data, is also present when trying to access the data. The system would require on or all of the following to be met in order to be unlocked: the user code from the card entered into the application security pin pad screen to allow access, the user fingerprint to be present and match the fingerprint on the card to be met (e.g., using either a built or external fingerprint scanner is connected to the equipment analyzer), or the user enters specific contact information as required to unlock the system.

A use case scenario could be a user has classified information for use on an assessment system of the present invention on a Department of Defense (DoD) vessel. In order to ensure that: 1) the data is isolated from the rest of the data on the equipment analyzer and 2) the data cannot be accessed by anyone other than the specified user, a PKI card may be used to encrypt the database and lock the assessment system out from any other access. The user would then use their card, plugged into an attached or built in PKI reader, along with entering certain information from the card to access their information. If another user tries to use their card, the system would not allow access to the assessment application or database as the card information does not match what is embedded into a Configuration File. If the user card is lost and discovered by a third party, they would still be unable to access the information with the card plugged in as they would need to know the information stored on the card to enter into the system. This would provide a dual authentication security check to ensure maximum protection on the data.

Figure 7:
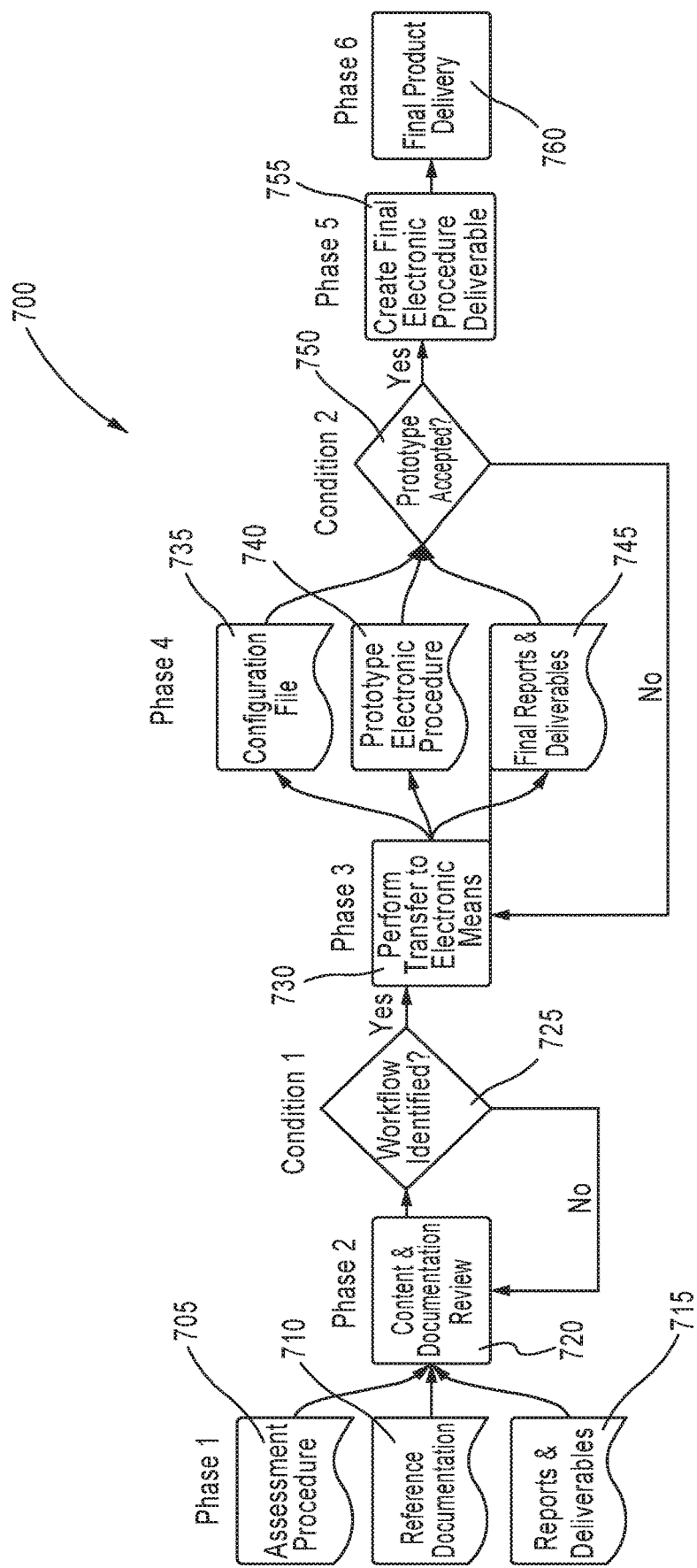
FIG. 7 is a flow diagram illustrating a process for creating a backend client-specific database schema in accordance with an example embodiment of the present disclosure.

Referring to FIG. 7, the flow chart depicts a process 700 used for transposing all components of a procedural assessment from individual physical documents to an electronic interface (e.g., the tool user interface 330 of FIG. 3) on an electronic device (e.g., the equipment analyzer 100 of FIG. 1). Phase 1 includes identifying and obtaining all physical aspects of the procedural assessment including but not limited to: the assessment procedure 705, all applicable reference documents 710, all final reports and all final deliverables 715. Once the documents are identified and obtained, the process 700 transitions to Phase 2. Phase 2 depicts a high level overview of the internal process 720 used to review all documentation received and make adjustments to better fit the electronic format. At Condition 1 725, an internal review is conducted to ensure that the documentation and content reviewed equates to a workflow identified by a customer. If it has, Phase 3 is implemented. If it does not, then the review 720 of the content and documentation continues until the condition is satisfied. At Phase 3, the process 700 converts 730 the physical procedural assessment components into an electronic interface for an electronic device. The process 700 then continues to Phase 4. Phase 4 includes three major parallel and/or contemporaneous processes. In a first process 735, a configuration file is created and contains all information for the device to read and translate to a secure database. In a second process 740, the process 700 performs a prototype electronic procedure in which a user-interface is created on the electronic device. In a third process 745, an output of a final reports and deliverables is reported based on the user input through the user interface. The process 700, at Condition 2 750, determines if the prototype electronic process functions correctly and serves the correct purpose for the designated workflow. If the prototype is deemed to meet both these criteria, the process 700 moves to Phase 5. If the prototype does not satisfy both of these criteria, then the process 700 moves back to Phase 3 to continue developing the electronic assessment. The process 700, at Phase 5, creates 755 a final release version of the electronic assessment. At Phase 7, the process 700 performs a final delivery 760 of a release version of the electronic assessment to the designated customer.

Figure 8:
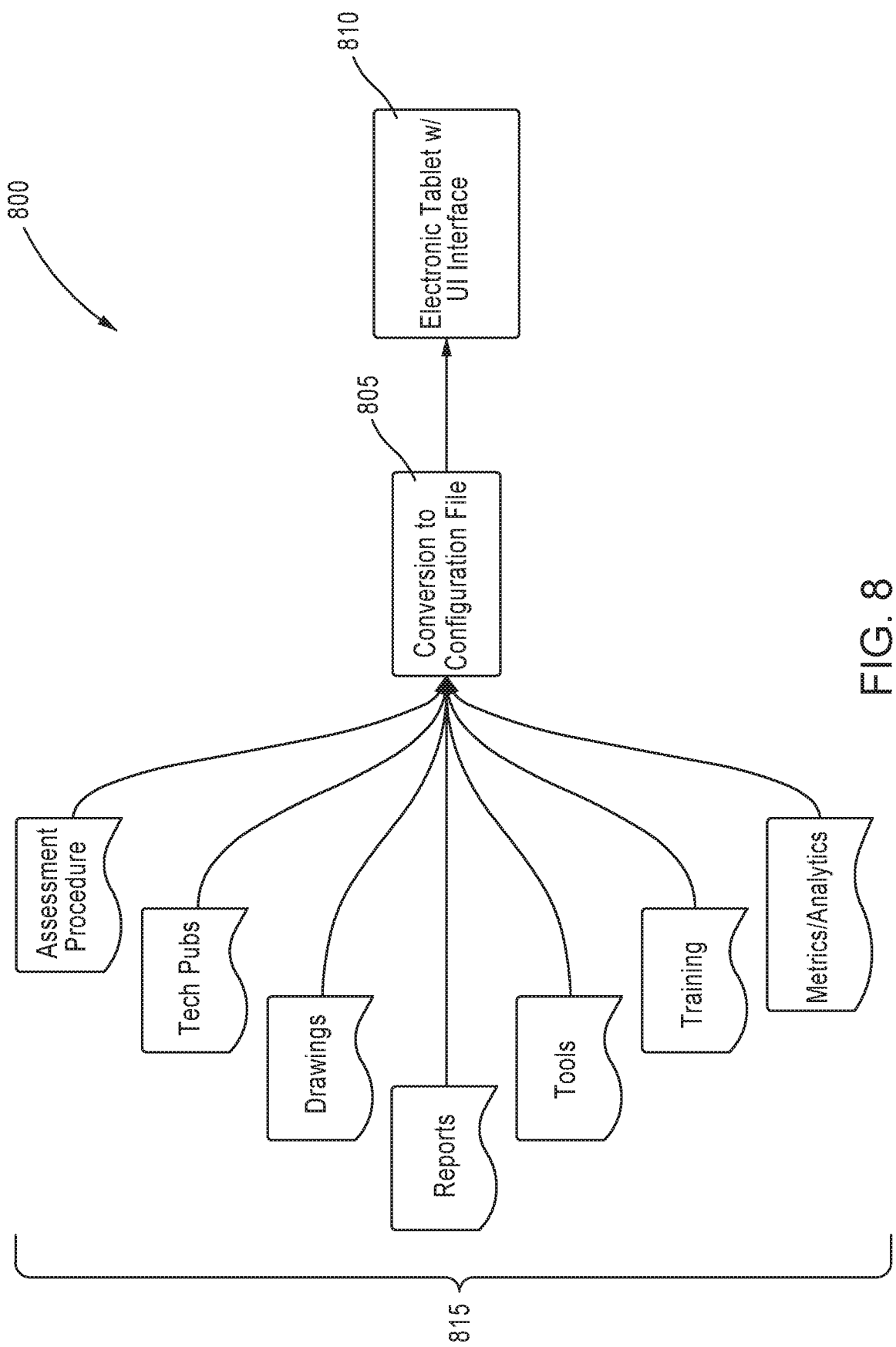
FIG. 8 is a flow diagram of a process for creating a Configuration File in accordance with an example embodiment of the present disclosure.

FIG. 8 shows a process 800 for creating a configuration file 805 that facilitates a user-interface 810 within the equipment analyzer, for example, the classification screen 605 of FIG. 6B and the evaluation screen 610 of FIG. 6C. The configuration file 810 is created from physical items 815 as shown, including but not limited to workflow, assessments procedures, reference documentation, and report deliverables format. Each item 815 can contain more than a single document or function, depending on a case-by-case basis and not all items need to be incorporated to constitute a finished product.

The configuration file 810 can also be created from functionality. In some embodiments, the functionality can be a custom functionality. Custom functionality includes, for example, any additional features/functionality needed in order to better assist with the workflow of a particular instance of the assessment application, herein referred to as the Workflow, Assessment, Verification, and Evaluation (WAVE) application. The Configuration File also enables consistent naming schema and backend configuration management of a client specific database.

In a preferred embodiment, a Configuration File is built using a WAVE Configuration File application program interface (API). The Configuration File contains structure and information needed for the equipment analyzer to identify all existing entities and relationships, and create a secure database to maintain the data for the assessment. The Configuration File provides the assessment procedures, all reference documentation, final deliverable layouts (if specific layouts are required), and any additional customized features or functionality needed. The Configuration File, along with the database created from the Configuration File, can be encrypted using Advanced Encryption Standard AES-256 encryption technology to ensure safe and secure data storage on the electronic device. All reference documentation can also be stored utilizing AES-256 data encryption. Embodiments of the present disclosure may utilize storage methods that are also Federal Information Processing Standard FIPS-140 compliant.

Figure 9:
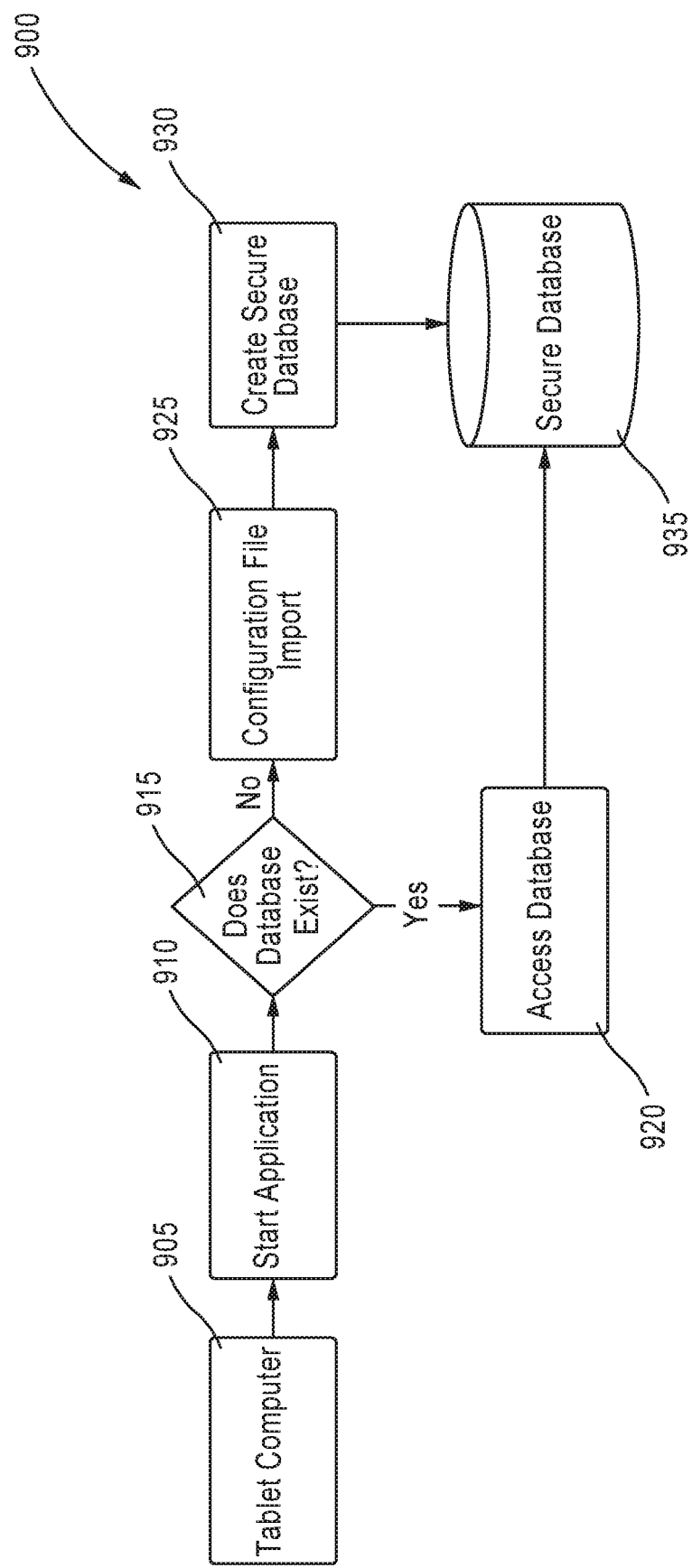
FIG. 9 is a flow diagram of an application startup process in accordance with an example embodiment of the present disclosure.

FIG. 9 shows a process 900 that the WAVE application performs upon startup. These steps can be performed in the background. Once the user selects the application on the tablet computer (905, 910), the application will then look for a relevant database model (915). If a relevant database model does exist, then the application fetches the database (920), which can be a secure database, and loads all applicable data. The database is a persistence store so that all interactions by user that have not been deleted by the user will be recorded into the database loaded into the application. If the application cannot find an existing database, the applications calls a configuration file located within the application bundle (925). The configuration file contains protocols that describe what features/functionality the database needs to be prebuilt with, along with all necessary content for the application. The application then creates (930) a persistence store in a secure database 935 for the application. The database 935 will remain until the application is deleted off the tablet computer completely.

Figure 10:
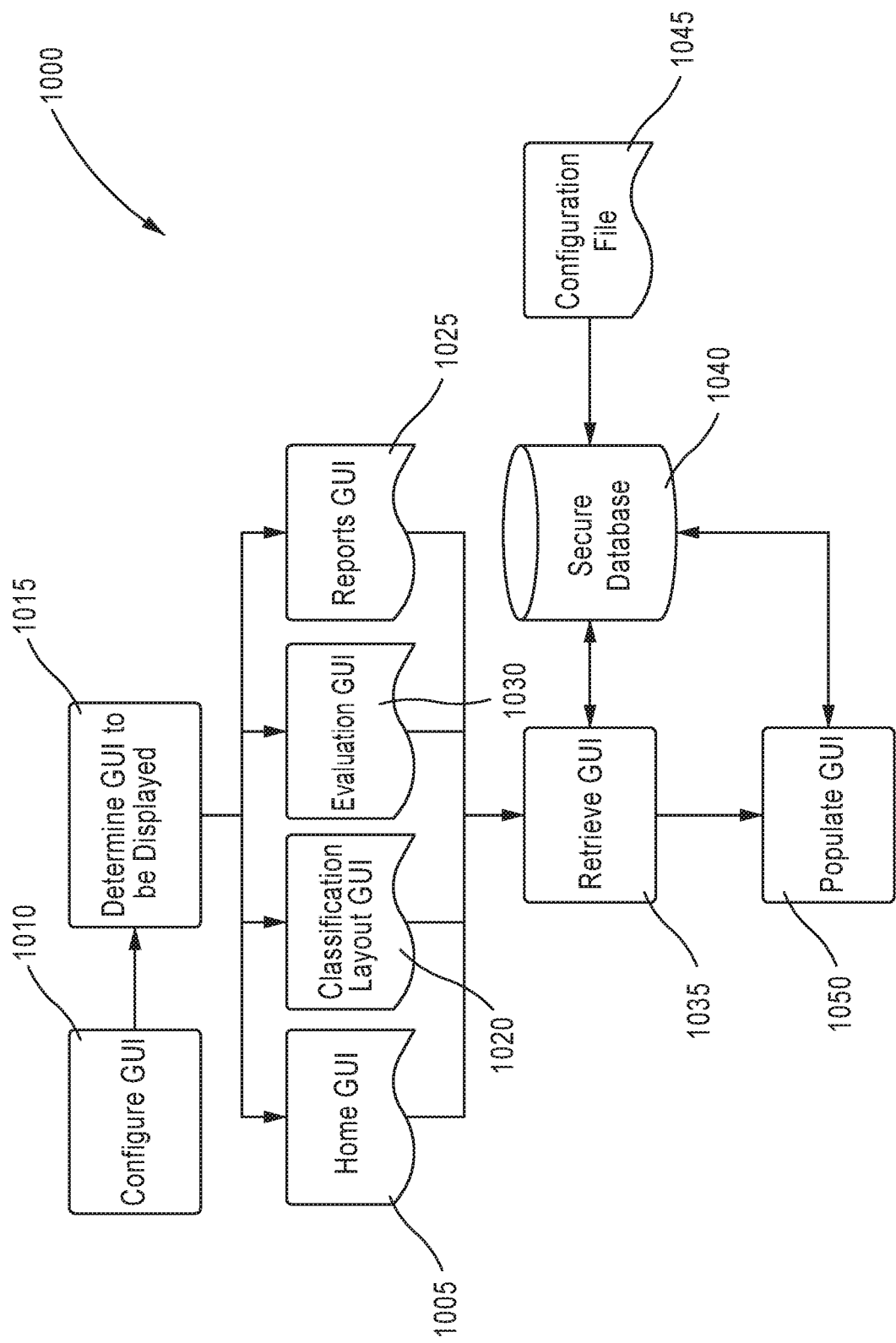
FIG. 10 is a flow diagram of a process for determining a specific GUI (Graphical User Interface) to be displayed to a user based on the user's selections in accordance with an example embodiment of the present disclosure.

FIG. 10 shows a process 1000 for displaying a specific GUI (Graphical User Interface) based off of the selections by the user. There are four (4) different GUI shells that can be displayed. The Home GUI 1005 is the default screen that is shown whenever the WAVE application is started that has been previously closed. If the application is running as a background thread, the GUI that was displayed when the application was sent to a background thread will be present due to a persistence store (1010, 1015). From the home screen, the user can select different options to access either the Classification Layout GUI 1020 or the Reports GUI 1025 (if any reports exist to be shown). The Evaluation GUI 1030 can only be reached either from the Classification Layout GUI 1020 or the Reports GUI 1025 (if any report exists). The GUI is then loaded (1035) into memory from the secure database model along with all features/functionality that was passed into the database 1040 from the configuration file 1045 during the initial database creation. Once the GUI is retrieved (1035) based on user selection, applicable content is populated accordingly (1050) from the database 1045.

Figure 11:
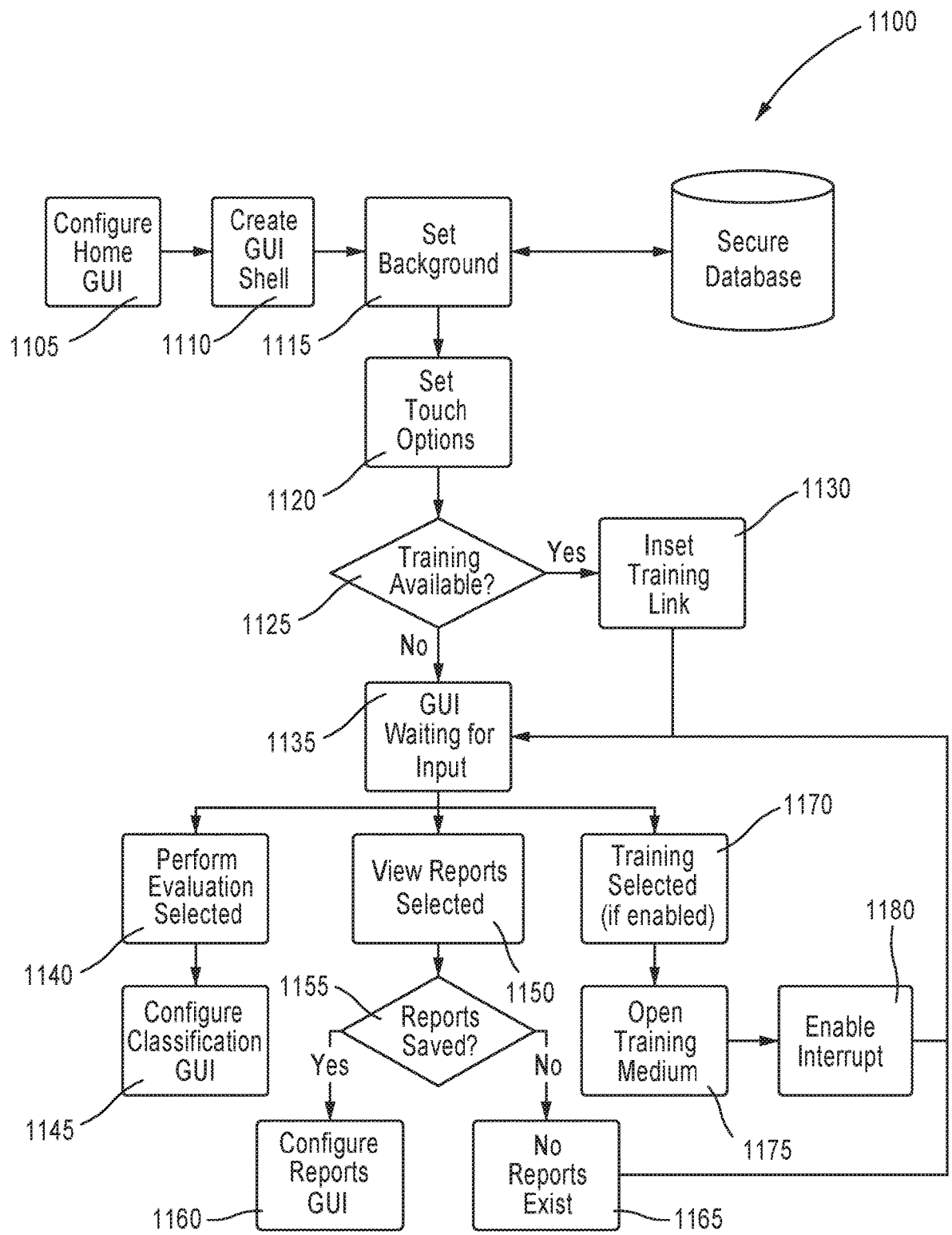
FIG. 11 is a flow diagram of a process of setting up a Home GUI (Graphical User Interface) and actions to be executed based on the user's interaction with the Home GUI in accordance with an example embodiment of the present disclosure.

FIG. 11 shows a process 1100 for setting up the Home GUI and also the actions and conditions for user input on the Home GUI. Once the WAVE application is started, or the user returns to the Home screen, a GUI shell is created (1105, 1110). The variable options for the home screen include the background image and whether or not training is available for the application. The background is set within the Configuration File. The Home GUI then pulls the image from the database 1101 and loads it into the GUI shell (1115). Then the available options for the user are added into the GUI (1120), specifically the transitions for accessing a new assessment via the Classification Layout GUI or viewing past reports from the Reports GUI. The application then checks (1125) to see if there is a training reference within the application bundle. If it does, it provides a link to the training at the bottom of the Home GUI (1130). If there is no training available, the application stands by for user input (1135). If the Perform Evaluation is selected the application will segue into the Classification GUI (see FIG. 12 described below) (1140, 1145). If the View Reports is selected, the application will check that database for any reports that exist (1150, 1155). If there are reports in the database, then the Reports GUI is called (see FIG. 15 described below) (1160). If there are no reports, then the application will return to waiting for a user input within the Home GUI (1165, 1125). If training exists and is selected by the user, the application transitions into the training and provides an interrupt to return back to the Home GUI once the user finishes training (1170, 1175, 1180).

Figure 12:
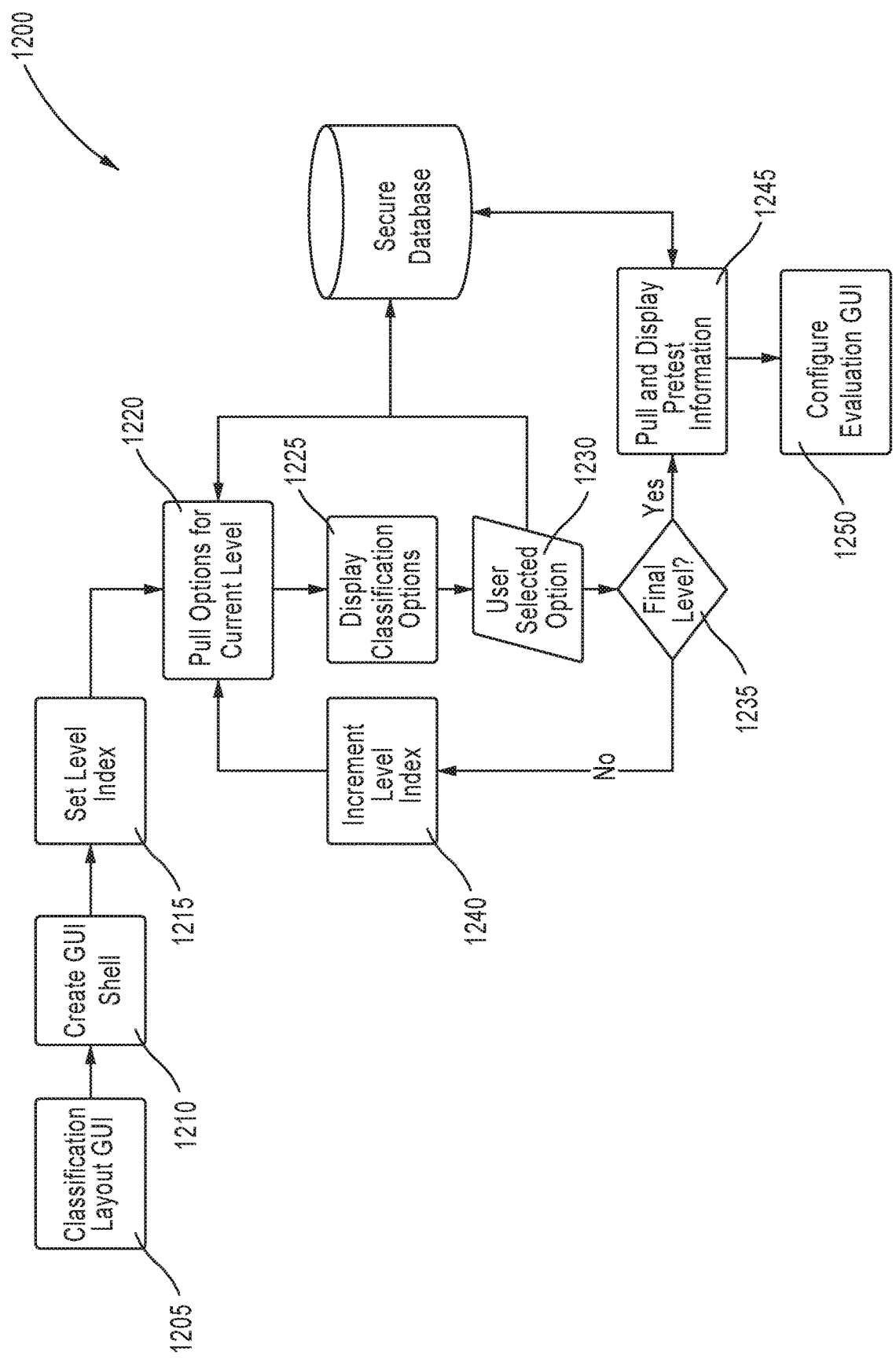
FIG. 12 is a flow diagram of a process for setting up a Classification GUI (Graphical User Interface) and actions to be executed based on the user's interaction with the Classification GUI in accordance with an example embodiment of the present disclosure.

FIG. 12 shows a process 1200 for setting up the Classification GUI and also the actions and conditions for user input on the Classification GUI. Once the user selects Perform Evaluation on the Home GUI, the Classification GUI shell is created (1205, 1210). Then an index is set for the currently level in the classification tree (1215). The number of levels is dynamic in terms of an application can be built with as many or as few as desired. However, once it is within the Configuration File it becomes static for that instance of the WAVE application. The current level options are then pulled from the database and displayed to the user (1220, 1225). Once the selects their next option, it is inputted into the database as the entity for that level reference (1230). The WAVE application then checks to see if there are any more levels after that by checking to see if the key for that option was "assessment" (1235). The assessment key within the Configuration File that is then stored in the database is the last level for all applications. If the key that is pulled is the assessment, then the application knows the user has selected all options and then displays the pretest information so the user can select to start their assessment. If it is not the "assessment" key then the level is incremented and the process repeated until the user reaches the "assessment" level in the classification tree (1240). Once the pretest information is displayed, the user can either dismiss and return to edit their level choices or they can start their assessment in which the WAVE application will configure the Evaluation GUI (see FIG. 13 described below) (1245, 1250).

Figure 13:
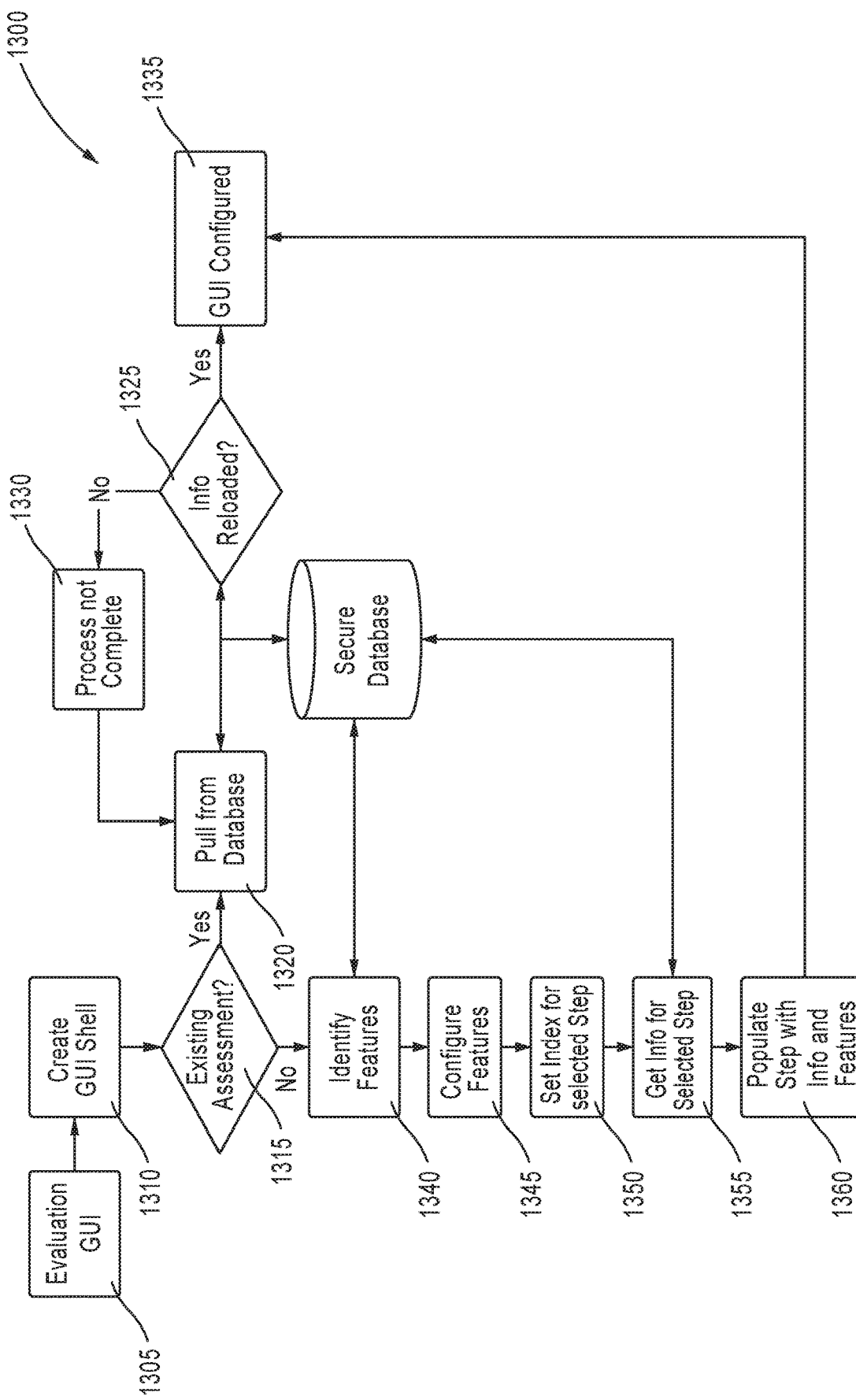
FIG. 13 is flow diagram of a process for setting up an Evaluation GUI (Graphical User Interface) and actions to be executed based on the user's interaction with the Classification GUI in accordance with an example embodiment of the present disclosure.

FIG. 13 shows a process 1300 for setting up the Evaluation GUI and also the actions and conditions for user input on the Evaluation GUI. The Evaluation GUI can either be reached from starting a new assessment or accessing an existing assessment (1305, 1310). If the assessment exists, the WAVE application will pull the persistent store data model from the database (1315, 1320). It will then load all applicable information along with all user submitted data that previously existed the last time the assessment was completed (1325, 1330, 1335). If the user has selected a new assessment, the WAVE application pulls the Features required for the selected assessment from the database (1340). Once pulled, the features are configured and the index is set to the first step in the assessment (1345, 1350). The test inspection info for that step is populated from the database and displayed to the user (1355, 1360).

Figure 14:
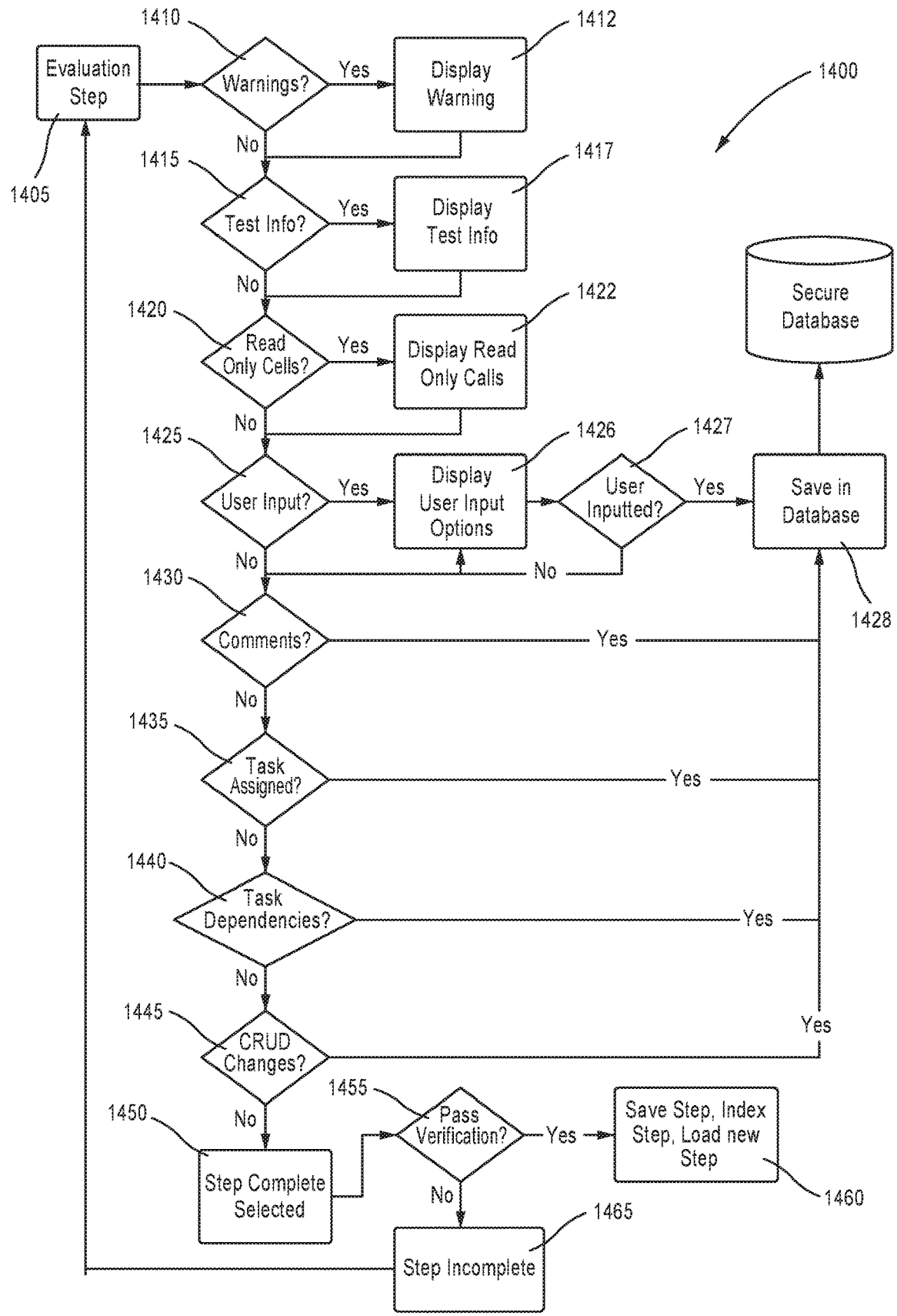
FIG. 14 is a flow diagram of a process for configuring test inspection information for an individual step and also setting up features required to execute that step in an assessment in accordance with an example embodiment of the present disclosure.

FIG. 14 shows a process 1400 for setting up the test inspection information and the WAVE application features for the indexed step in an assessment. It also provides conditions for what to do with user input collected. Once a step is select the WAVE application uses that step index to locate the corresponding entry within the database. It then populates the contents it found in the database to the Evaluation GUI by using identifiers from the configuration file (1405). This flow chart breaks down the current feature sets and information of one instance of the WAVE application. Once the information is pulled out of the database, it is deciphered by WAVE. It will look for a tag for "Warnings" (1410). If a tag exists, WAVE will display the Warning information in a pop-up window to the user (1412). If no Warnings exist, WAVE will move onto the next check in the sequence. Test Info and Read only cells round out the non-user input options within this instance of the WAVE application (1415, 1420). One of these two needs to exist in order to provide the user with directions on what to accomplish within the current step (1417, 1422). They can both exist but at least one must be present in order for WAVE to proceed. The remaining features in the selected step are related to User Input (1425-1428). User Input, at a high level in WAVE, is any user related feedback that is required in order for a step to pass verification and move on in the assessment. These User Inputs include Equipment State ratings, manual input readings, decibel widget cell meter readings, stop watch widget cell readings, or calendar input cells. WAVE then checks to see if the user inputted any comments that need to be amended to the end of the report along with the associated step (1430). If a state rating selected for the equipment is anything but Satisfactory, WAVE requires the user to input a comment describing the equipment state before the step can pass verification. Other feature sets that this WAVE instance utilizes are Task Dependencies, Personnel Assignments, CRUD, which are check at steps 1435, 1440, and 1445. There are other feature sets that can be found in the WAVE API. Task Dependencies are set up by the user to create direct parent/child relationships between steps to ensure items are completed in the correct order. A parent step can be linked with multiple children to ensure that the parent step cannot be completed until all children steps are completed. This is just one example of how Task Dependencies can be utilized. Task Assignments are used to designate tasks to be completed by a specific user. This allows assessments to be broken down into multiple "teams" of personnel completing their assigned portion of the assessment. CRUD stands for Create, Read, Update, and Delete. This functionality gives the user access to modify the Configuration File on the File. It allows for creating new steps or inputs within an assessment, update existing steps, or delete steps out of the assessment completely. Any changes are then stored in the data model in the database. Once the user is finished within the currents step, they select Step Complete to move onto the next step (1450). The Verification process will verify the user has completed all necessary items within the current step before moving on (1455). If the Verification process passes, the data is saved in the database one last time and the user is presented with the next step (1460). If the Verification process fails, the user is notified of what the failure was and required to complete the action (1465). They can then hit Step Complete again and rerun the Verification process.

Figure 15:
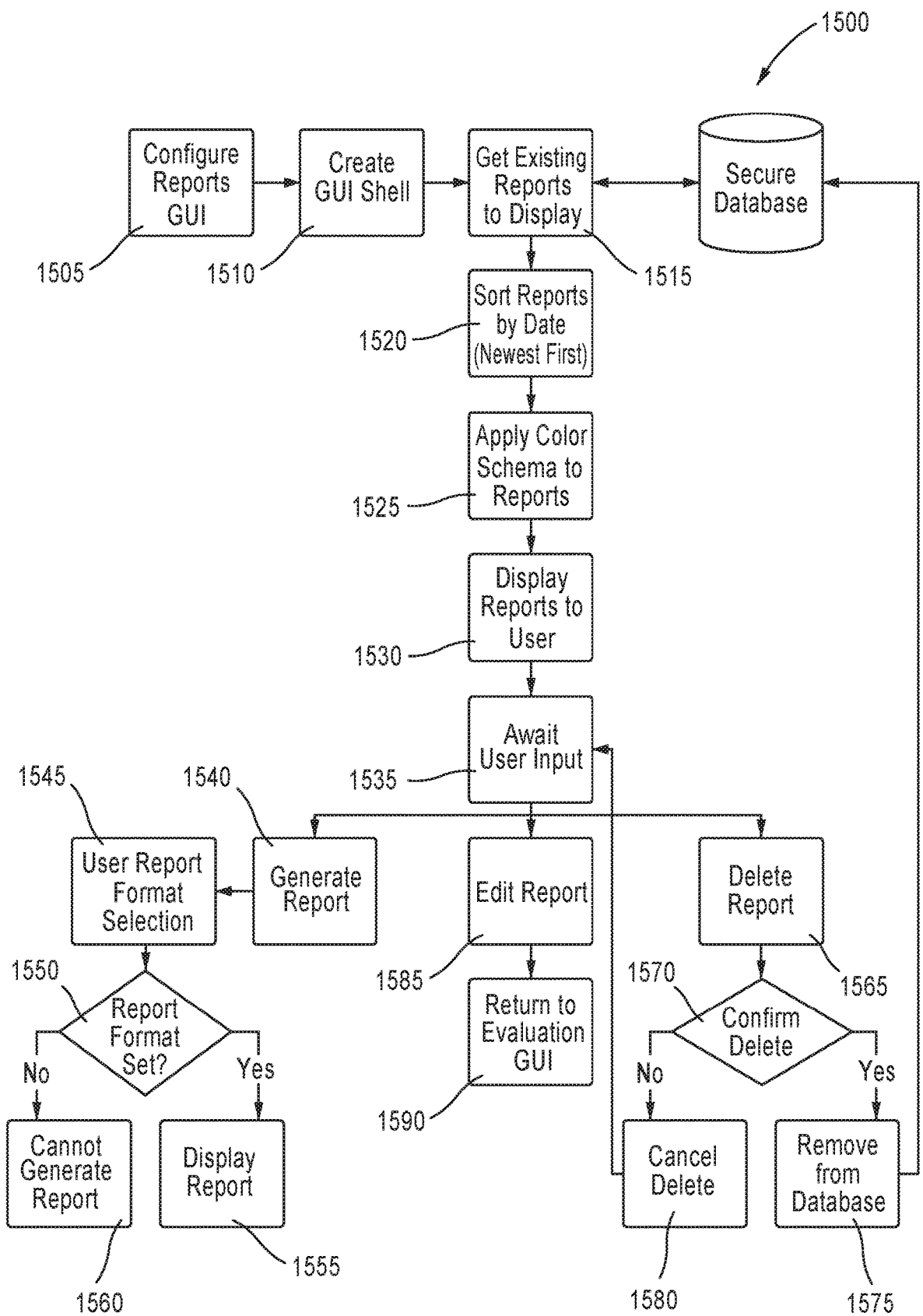
FIG. 15 is a flow diagram of a process for setting up a Reports GUI (Graphical User Interface) and actions to be executed based on the user's input in accordance with an example embodiment of the present disclosure.

FIG. 15 shows a process 1500 for setting up the Reports GUI and also the possible user actions along with their conditions and resolutions. The Reports GUI assumes that there are reports that exist when it is called. The Home GUI will alert the user if no reports exist and won't let the user reach the Reports GUI. Once the GUI shell is created, existing reports will be pulled from the database (1505, 1510, 1515). They will be displayed to the user in chronological order with the most recent reports being displayed at the top of the directory (1520). The reports then go through the Verification Process for proper color schema to be applied and displayed to the user (1525, 1530). The user then can select their desired report from the list provide and either generate the report, edit the report (within the assessment or final items such as adding signatures), or delete a specific report (1535). If a user generates a report, the specific report type is identified and then displayed to the user within the WAVE application (1540, 1545, 1550, 1555). If no report format is set, a message is displayed to the user and returns to the main screen of the Reports GUI (1560). If the User tried to delete the report a confirmation screen appears to ensure the user wishes to delete the report (1565, 1570, 1575, 1580). If the user chooses to edit the report, the Evaluation GUI is called and the report loaded via the Evaluation GUI flow chart (1585, 1590).

Various modifications of the invention and many further embodiments thereof, in addition to those shown and described herein will become apparent to those skilled in the art from the full contents of this document. The subject matter herein contains important information, exemplification and guidance that can be adapted to the practice of this invention in its various embodiments and equivalents thereof. For example, a process pipeline (e.g. the process pipeline 125 of FIG. 1) can include a "tool" that is another process pipeline. Accordingly, this is one example of an assessment procedure having a sub-assessment procedure. As another example, a controller (e.g., the controller 115 of FIG. 1) can control one tool (e.g., the tool 130 of FIG. 1). Accordingly, there can be a one-to-one association between control and tool.

What is claimed is:

1. An equipment analyzer for evaluating a state of equipment, the equipment analyzer comprising:
   an interactive interface configured to arrange a plurality of selectable assessment elements, at least one selectable assessment element of the plurality of selectable assessment elements represents an assessment procedure for evaluating a state of an equipment, the at least one selectable assessment element being linked to a process pipeline stored in memory; and
   a controller configured to determine a proximity of the equipment analyzer to the equipment and, in response to a determination that the equipment analyzer is sufficiently close to the equipment, the controller further configured to
      activate one or more tools of the process pipeline, at least one tool of the one or more tools including an active state for carrying out a task at a location of the equipment, the at least one tool of the one or more tools configured to receive feedback regarding the task when the task is completed at the location of the equipment;
      in response to a determination that the equipment analyzer is no longer sufficiently close to the equipment, inactivate the one or more tools of the process pipeline such that the one or more tools cannot be used to provide feedback; and
      verify whether the task is completed based on the feedback and store the feedback in the memory.

2. The equipment analyzer of claim 1, wherein the controller is configured to request a resource for carrying out the task.

3. The equipment analyzer of claim 1, wherein the at least one tool includes information about carrying out the task.

4. The equipment analyzer of claim 1, wherein the at least one tool includes a parent tool representing a first task and a child tool representing a second task that must be completed before the first task can be completed; and
   wherein the controller verifies the first task is completed when the controller receives feedback regarding the first task and the second task.

5. The equipment analyzer of claim 1, wherein the at least one tool includes a task assignment for designating a user of the at least one tool; and wherein the controller verifies the task is completed when feedback is provided by that user.

6. The equipment analyzer of claim 1, wherein the feedback includes any one of written comments, ratings, and combinations thereof.

7. The equipment analyzer of claim 1, wherein the memory for storing the process pipeline and the feedback on the state of the equipment is a secured database.

8. The equipment analyzer of claim 7, wherein the secured database is generated based on information from a configuration file.

9. The equipment analyzer of claim 8, wherein the configuration file is encrypted.

10. The equipment analyzer of claim 8, wherein the configuration file is user configurable.

11. The equipment analyzer of claim 1, wherein the interactive interface, controller, and memory are included in a wireless transmitting/receiving device.

12. The equipment analyzer of claim 1 further comprising an assessment reporter for retrieving from the memory, feedback on the state of equipment and for formatting the feedback into a report.

13. The equipment analyzer of claim 1 further comprising an authenticator communicatively coupled to the controller for restricting use of the controller to an authenticated user.

14. The equipment analyzer of claim 13, wherein the authenticator is any one of a keypad, a public key infrastructure smart card reader, and a biometric reader.

15. The equipment analyzer of claim 1, wherein the controller is configured to generate a code from the feedback for recreating the feedback on a device different than the equipment analyzer, the code being attachable to the equipment.

16. The equipment analyzer of claim 15, further comprising a printer communicatively coupled to the controller printing the code onto a sticker for affixing the code onto the equipment.

17. The equipment analyzer of claim 1, wherein to determine the proximity of the equipment analyzer to the equipment is by a radio frequency identification (RFID) tag or a beacon technology.

18. A method for analyzing a state of equipment by a portable equipment analyzer, the method comprising:
arranging a plurality of selectable assessment elements in an interactive interface, at least one selectable assessment element of the plurality of selectable assessment elements represents an assessment procedure for evaluating a state of an equipment, the at least one selectable assessment element being linked to a process pipeline stored in memory;
responsive to a determination that the portable equipment analyzer is sufficiently close to the equipment,
activating one or more tools of the process pipeline, the least one tool of the one or more tools including an active state for carrying out a task at a location of the equipment such that the at least one tool of the one or more tools can be used to provide feedback regarding the task when the task is completed at the location of the equipment;
verifying whether the task is completed based on the feedback;
storing the feedback in the memory; and
response to a determination that the portable equipment analyzer is no longer sufficiently close to the equipment, inactivating the one or more tools of the process pipeline such that the one or more tools cannot be used to provide feedback.

19. The method of claim 18, wherein activating the at least one tool includes requesting a resource for carrying out the task.

20. The method of claim 18, wherein activating the at least one tool includes providing information about carrying out the task.

21. The method of claim 18, wherein the at least one tool includes a parent tool representing a first task and a child tool representing a second task that must be completed before the first task can be completed; and
wherein verifying includes verifying the first task is completed when the controller receives feedback regarding the first task and the second task.

22. The method of claim 18, wherein the at least one tool within the process pipeline includes a task assignment for designating a user of the at least one tool; and
wherein verifying includes verifying a step is completed when feedback is provided by that user.

23. The method of claim 18, wherein the feedback includes any one of comments, ratings, and combinations thereof.

24. The method of claim 18, wherein storing the feedback includes storing the state of the equipment in a secured database.

25. The method of claim 18 further comprising retrieving from the memory, the feedback on the state of the equipment and formatting the feedback into a report.

26. The method of claim 18 further comprising authenticating a user to restrict use of the equipment analyzer to an authenticated user.

27. The method of claim 26, wherein authenticating includes reading any one of a code, a public key infrastructure smart card, and a biometric marker.

28. The method of claim 18, further comprising generating a code from the feedback for recreating the feedback on a device; and
attaching the code to the equipment.

29. The method of claim 28, further comprising printing the code onto a sticker for affixing the code onto the equipment.

30. The method of claim 18, wherein determination that the portable equipment analyzer is sufficiently close to the equipment is by a radio frequency identification (RFID) tag or a beacon technology.

31. The method of claim 18, wherein arranging the plurality of selectable assessment elements in the interactive interface is based on information from a configuration file.

32. A non-transitory computer readable medium storing instructions executable by at least one processor of an equipment analyzer to execute a state of equipment analysis, the instructions being coded to instruct the at least one processor to:
arrange a plurality of selectable assessment elements in an interactive interface, at least one selectable assessment element of the plurality of selectable assessment elements representing an assessment procedure for evaluating a state of an equipment, the at least one selectable assessment element being linked to a process pipeline stored in memory;
responsive to a determination that the equipment analyzer is sufficiently close to the equipment,
activate one or more tools of the process pipeline, at least one tool of the one or more tools including an active state for carrying out a task at a location of the equipment;

receive feedback regarding the state of the equipment when the task is completed at the equipment location;
verify whether the task is completed based on the feedback;
store the feedback in the memory; and
response to a determination that the portable equipment analyzer is no longer sufficiently close to the equipment, inactivating the one or more tools of the process pipeline such that the one or more tools cannot be used to provide feedback.

* * * * *